US008687541B2

(12) United States Patent
Löhr et al.

(10) Patent No.: US 8,687,541 B2
(45) Date of Patent: Apr. 1, 2014

(54) LOGICAL CHANNEL PRIORITIZATION PROCEDURE FOR GENERATING MULTIPLE UPLINK TRANSPORT BLOCKS

(75) Inventors: Joachim Löhr, Wiesbaden (DE); Takahisa Aoyama, Yokohama (JP); Martin Feuersänger, Bremen (DE)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 13/265,468

(22) PCT Filed: Apr. 1, 2010

(86) PCT No.: PCT/EP2010/002119
§ 371 (c)(1),
(2), (4) Date: Nov. 15, 2011

(87) PCT Pub. No.: WO2010/121708
PCT Pub. Date: Oct. 28, 2010

(65) Prior Publication Data
US 2012/0057547 A1    Mar. 8, 2012

(30) Foreign Application Priority Data

Apr. 23, 2009  (EP) .................................... 09005727
Oct. 29, 2009  (EP) .................................... 09013642

(51) Int. Cl.
*H04W 52/28*    (2009.01)
*H04W 52/30*    (2009.01)

(52) U.S. Cl.
USPC .......................... 370/318; 455/127.1; 455/522

(58) Field of Classification Search
USPC ...................... 370/310.2, 318, 328–339, 349; 455/127.1, 422.1, 522
See application file for complete search history.

(56) References Cited

U.S. PATENT DOCUMENTS

| 7,925,268 B2 | 4/2011 | Sanders et al. |
| 2004/0127225 A1 | 7/2004 | Qiu et al. |

(Continued)

FOREIGN PATENT DOCUMENTS

| CN | 101263665 A | 9/2008 |
| EP | 1986455 A1 | 10/2008 |

(Continued)

OTHER PUBLICATIONS

3GPP TS 36.300 V8.7.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description, Stage 2 (Release 8), Dec. 2008, 13 pages.

(Continued)

*Primary Examiner* — Hoon J Chung
(74) *Attorney, Agent, or Firm* — Seed IP Law Group PLLC

(57) ABSTRACT

The invention relates to methods for scheduling of uplink transmission and generating transport blocks according to multiple received uplink assignments Furthermore, the invention is also related to the implementation of these methods in hardware and software. To propose strategies for generating plural transport blocks within a given time constraint, the invention introduces prioritization of the uplink assignments, so that multiple uplink assignments can be ranked in the mobile terminal in a priority order. The prioritization of the uplink assignments is used to determine the order in which the individual transport blocks corresponding to the uplink assignments are filled, respectively how the data of different logical channels is multiplexed to the transport blocks for transmission in the uplink. Another aspect of the invention is to suggest joint logical channel procedures that operate on virtual transport blocks accumulated from the received uplink assignments. One or more such joint logical channel procedure can be performed in parallel.

17 Claims, 16 Drawing Sheets

(56) References Cited

U.S. PATENT DOCUMENTS

| | | | |
|---|---|---|---|
| 2005/0208960 A1* | 9/2005 | Hassan | 455/522 |
| 2006/0003787 A1* | 1/2006 | Heo et al. | 455/522 |
| 2008/0057994 A1* | 3/2008 | Duan et al. | 455/522 |
| 2009/0225711 A1* | 9/2009 | Sammour et al. | 370/329 |
| 2011/0237288 A1* | 9/2011 | Ratasuk et al. | 455/522 |
| 2012/0057547 A1* | 3/2012 | Lohr et al. | 370/329 |
| 2012/0093011 A1* | 4/2012 | Ranta-Aho et al. | 370/252 |

FOREIGN PATENT DOCUMENTS

| | | |
|---|---|---|
| JP | 2004-128967 A | 4/2004 |
| JP | 2006-237897 A | 9/2006 |
| WO | 2008/131902 A1 | 11/2008 |

OTHER PUBLICATIONS

3GPP TS 36.213 V8.6.0, 3rd Generation Partnership Project; Technical Specification Group Radio Access Network; Evolved Universal Terrestrial Radio Access (E-UTRA); Physical layer procedures (Release 8), Mar. 2009, 11 pages.

T-Mobile, NTT DoCoMo, Vodafone, Orange, KPN, "Operator requirements and scenarios for UL buffer reporting/scheduling and grant assignment in E-UTRAN," R2-062606, 3GPP TSG-RAN WG2#54, Tallinn, Estonia, Aug. 28-Sep. 1, 2006, pp. 1-2.

Ericsson, "Carrier aggregation in LTE-Advanced," R1-082468, TSG-RAN WG1 #53bis, Warsaw, Poland, Jun. 30-Jul. 4, 2008, 6 pages.

ZTE, "Downlink data and control structure for LTE-A," R1-084113, 3GPP TSG RAN WG1 Meeting #55, Prague, Czech Republic, Nov. 10-14, 2008, 5 pages.

LG Electronics Inc., "Logical Channel Prioritization for Aggregated Carriers," R2-094630, 3GPP TSG-RAN2 Meeting #67, Shenzhen, China, Aug. 24-28, 2009, 3 pages.

Alcatel-Lucent Shanghai Bell, Alcatel-Lucent, "PUSCH Power Control for Carrier Aggregation," R1-093770, 3GPP TSG RAN WG1 Meeting #58bis, Miyazaki, Japan, Oct. 12-16, 2009, 3 pages.

Ericsson, ST-Ericsson, "Uplink Power Control for Carrier Aggregation," R1-094274, 3GPP TSG RAN WG1 Meeting # 58bis, Miyazaki, Japan, Oct. 12-16, 2009, 4 pages.

3GPP TS 36.321 V8.5.0, 3rd Generation Partnership Project; Technical Specification Group Radio Access Network; Evolved Universal Terrestrial Radio Access (E-UTRA), Medium Access Control (MAC) protocol specification (Release 8), 46 pages.

European Search Report for corresponding EP Application No. 09013642, dated Nov. 18, 2009, 3 pages.

European Search Report for corresponding EP Application No. 09005727, dated Nov. 17, 2009, 3 pages.

International Search Report for PCT/EP2010/002119, dated Jun. 7, 2010, 7 pages.

Nokia, Nokia Siemens Networks, "Transport block mapping and DL control signalling in LTE-Advanced," R1-090233, Agenda Item: 12.2, 3GPP TSG-RAN WG1 Meeting #55bis, Ljubljana, Slovenia, Jan. 12-16, 2009, 7 pages.

Notice of Reasons for Rejection, received Sep. 24, 2013, for corresponding Japanese Application No. 2012-506362, 7 pages.

Office Action, dated Sep. 4, 2013, for corresponding Chinese Application No. 201080017791.9, 10 pages.

\* cited by examiner

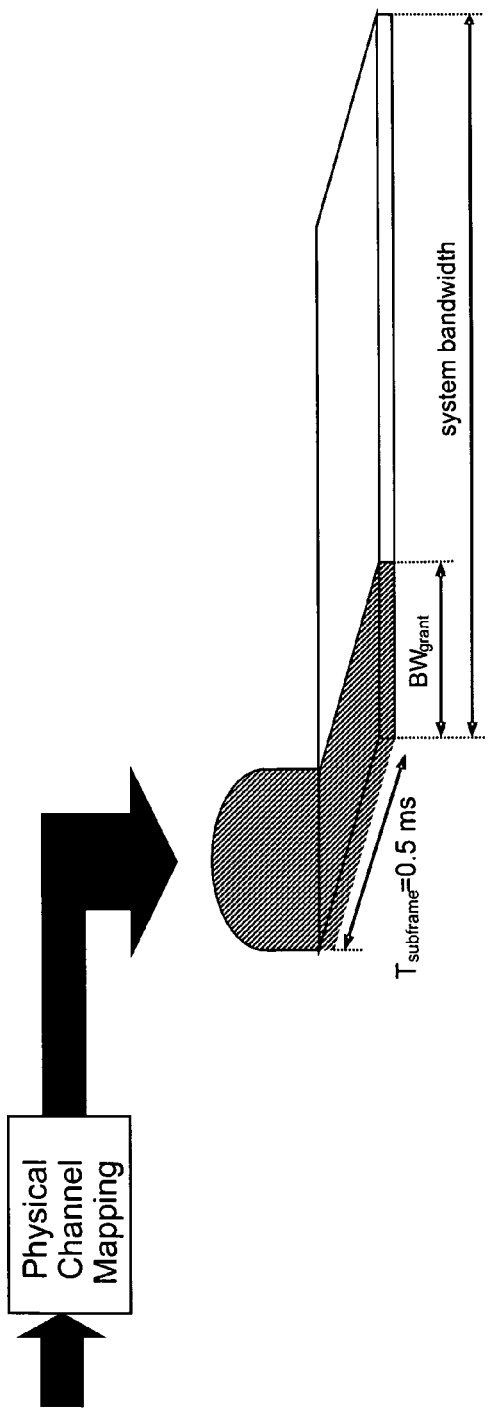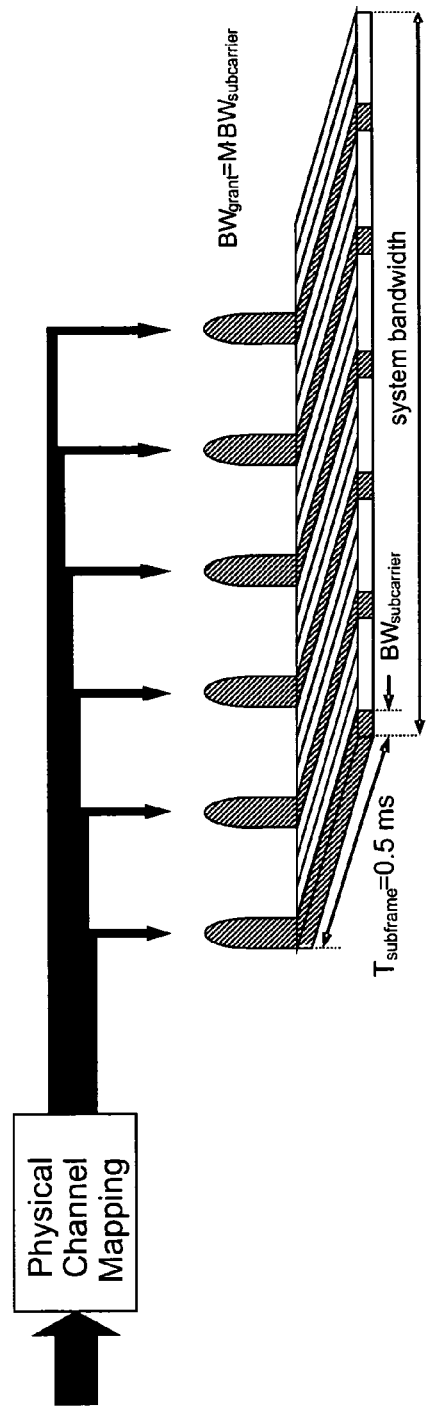

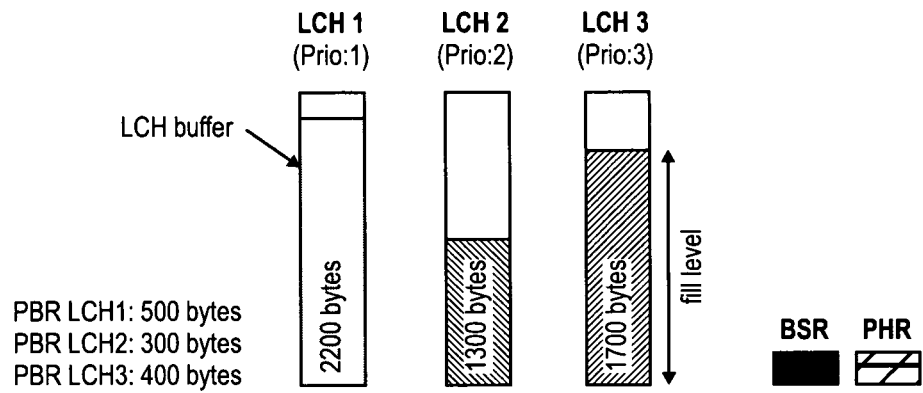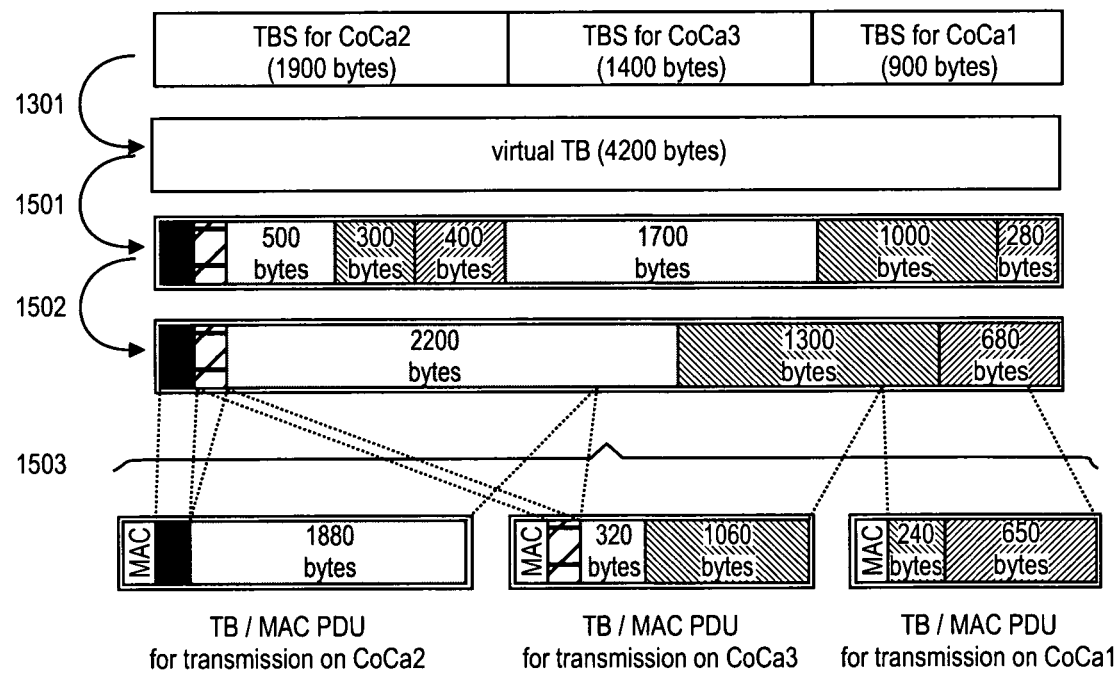
Fig. 15

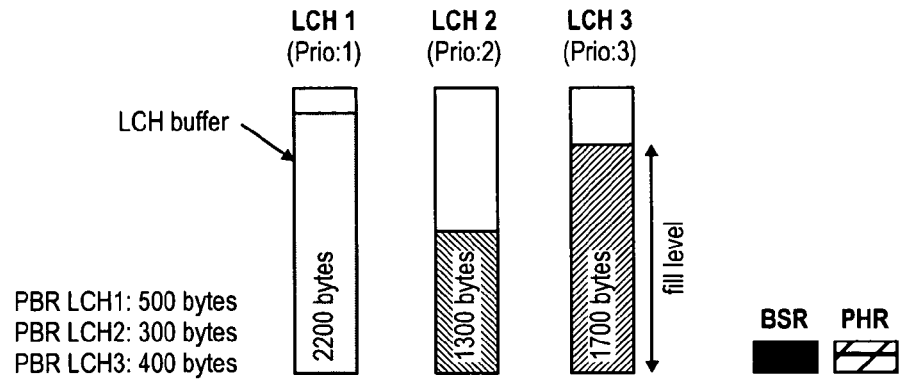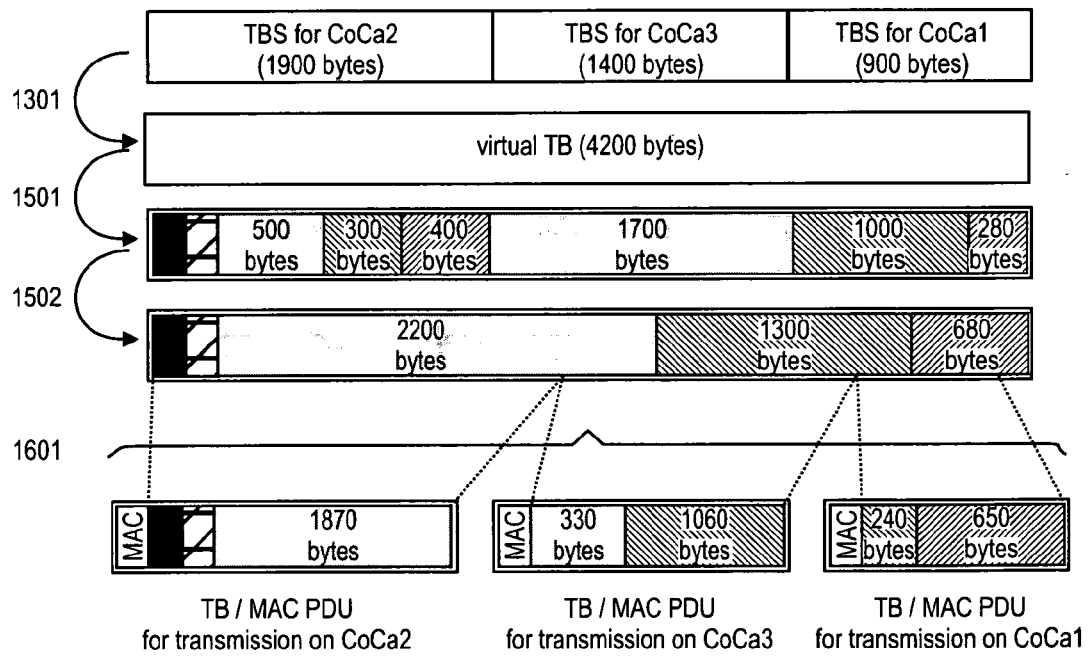
Fig. 16

LOGICAL CHANNEL PRIORITIZATION PROCEDURE FOR GENERATING MULTIPLE UPLINK TRANSPORT BLOCKS

FIELD OF THE INVENTION

The invention relates to methods for scheduling of uplink transmission and generating transport blocks according to multiple received uplink resource assignments. Furthermore, the invention is also related to the implementation/performance of these methods in/by hardware, i.e. apparatuses, and their implementation in software.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE Rel. 8.

LTE Architecture

The overall architecture is shown in FIG. 1 and a more detailed representation of the E-UTRAN architecture is given in FIG. 2. The E-UTRAN consists of eNode B, providing the E-UTRA user plane (PDCP/RLC/MAC/PHY) and control plane (RRC) protocol terminations towards the user equipment (UE). The eNode B (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink QoS, cell information broadcast, ciphering/deciphering of user and control plane data, and compression/decompression of downlink/uplink user plane packet headers. The eNode Bs are interconnected with each other by means of the X2 interface.

The eNode Bs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNode Bs. The SGW routes and forwards user data packets, while also acting as the mobility anchor for the user plane during inter-eNode B handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Uplink Access Scheme for LTE

For uplink transmission, power-efficient user-terminal transmission is necessary to maximize coverage. Single-carrier transmission combined with FDMA (Frequency Division Multiple Access) with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA—Orthogonal Frequency Division Multiple Access), and the corresponding improved power-amplifier efficiency and assumed improved coverage (higher data rates for a given terminal peak power). During each time interval, eNode B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (eNode B), aided by insertion of a cyclic prefix in the transmitted signal.

The basic physical resource used for data transmission consists of a frequency resource of size $BW_{grant}$ during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated in FIG. 3 and FIG. 4. As can be seen from FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as shown in FIG. 4, distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

At first glance, the spectrum in FIG. 4 may give the impression of a multi-carrier signal where each comb-finger corresponds to a "sub-carrier". However, from the time-domain signal-generation of a distributed single-carrier signal, it should be clear that what is being generated is a true single-carrier signal with a corresponding low peak-to-average power ratio. The key difference between a distributed single-carrier signal versus a multi-carrier signal, such as e.g. OFDM (Orthogonal Frequency Division Multiplex), is that, in the former case, each "sub-carrier" or "comb finger" does not carry a single modulation symbol. Instead each "comb-finger" carries information about all modulation symbols. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that, in many cases the scheduling decision may decide to give the whole bandwidth to a single user equipment to achieve high data rates.

Uplink Scheduling Scheme for LTE

The uplink scheme allows for both scheduled access, i.e. controlled by eNodeB, and contention-based access.

In case of scheduled access the user equipment is allocated a certain frequency resource for a certain time (i.e. a time/frequency resource) for uplink data transmission. However, some time/frequency resources can be allocated for contention-based access. Within these time/frequency resources, user equipments can transmit without first being scheduled. One scenario where user equipment is making a contention-based access is for example the random access, i.e. when user equipment is performing initial access to a cell or for requesting uplink resources.

For the scheduled access eNodeB scheduler assigns a user a unique frequency/time resource for uplink data transmission. More specifically the scheduler determines
which user equipment(s) that is (are) allowed to transmit,
which physical channel resources (frequency),
Transport format (Transport Block Size (TBS) and Modulation Coding Scheme (MCS)) to be used by the mobile terminal for transmission The allocation information is signaled to the user equipment via a scheduling grant, sent on the so-called L1/L2 control channel. For simplicity, this downlink channel is referred to the "uplink grant channel" in the following.

A scheduling grant message (also referred to as an resource assignment herein) contains at least information which part of the frequency band the user equipment is allowed to use, the validity period of the grant, and the transport format the user equipment has to use for the upcoming uplink transmission. The shortest validity period is one sub-frame. Additional information may also be included in the grant message, depending on the selected scheme. Only "per user equipment" grants are used to grant the right to transmit on the Uplink Shared Channel UL-SCH (i.e. there are no "per user equipment per RB" grants). Therefore the user equipment needs to distribute the allocated resources among the radio bearers according to some rules, which will be explained in detail in the next section.

Unlike in HSUPA there is no user equipment based transport format selection. The base station (eNodeB) decides the transport format based on some information, e.g. reported scheduling information and QoS information, and user equipment has to follow the selected transport format. In HSUPA eNodeB assigns the maximum uplink resource and user equipment selects accordingly the actual transport format for the data transmissions.

Uplink data transmissions are only allowed to use the time-frequency resources assigned to the user equipment through the scheduling grant. If the user equipment does not have a valid grant, it is not allowed to transmit any uplink data. Unlike in HSUPA, where each user equipment is always allocated a dedicated channel there is only one uplink data channel shared by multiple users (UL-SCH) for data transmissions.

To request resources, the user equipment transmits a resource request message to the eNodeB. This resources request message could for example contain information on the buffer status, the power status of the user equipment and some Quality of Services (QoS) related information. This information, which will be referred to as scheduling information, allows eNodeB to make an appropriate resource allocation. Throughout the document it's assumed that the buffer status is reported for a group of radio bearers. Of course other configurations for the buffer status reporting are also possible. Since the scheduling of radio resources is the most important function in a shared channel access network for determining Quality of Service, there are a number of requirements that should be fulfilled by the uplink scheduling scheme for LTE in order to allow for an efficient QoS management (see 3GPP RAN WG#2 Tdoc. R2-R2-062606, "QoS operator requirements/use cases for services sharing the same bearer", by T-Mobile, NTT DoCoMo, Vodafone, Orange, KPN; available at http://www.3gpp.org/ and incorporated herein by reference):
Starvation of low priority services should be avoided
Clear QoS differentiation for radio bearers/services should be supported by the scheduling scheme
The uplink reporting should allow fine granular buffer reports (e.g. per radio bearer or per radio bearer group) in order to allow the eNode B scheduler to identify for which Radio Bearer/service data is to be sent.

It should be possible to make clear QoS differentiation between services of different users It should be possible to provide a minimum bit-rate per radio bearer As can be seen from above list one essential aspect of the LTE scheduling scheme is to provide mechanisms with which the operator can control the partitioning of its aggregate cell capacity between the radio bearers of the different QoS classes. The QoS class of a radio bearer is identified by the QoS profile of the corresponding SAE bearer signaled from serving gateway to eNode B as described before. An operator can then allocate a certain amount of its aggregate cell capacity to the aggregate traffic associated with radio bearers of a certain QoS class.

The main goal of employing this class-based approach is to be able to differentiate the treatment of packets depending on the QoS class they belong to. For example, as the load in a cell increases, it should be possible for an operator to handle this by throttling traffic belonging to a low-priority QoS class. At this stage, the high-priority traffic can still experience a low-loaded situation, since the aggregate resources allocated to this traffic is sufficient to serve it. This should be possible in both uplink and downlink direction.

One benefit of employing this approach is to give the operator full control of the policies that govern the partitioning of the bandwidth. For example, one operator's policy could be to, even at extremely high loads, avoid starvation of traffic belonging to its lowest priority QoS Class. The avoidance of starvation of low priority traffic is one of the main requirements for the uplink scheduling scheme in LTE. In current UMTS Release 6 (HSUPA) scheduling mechanism the absolute prioritization scheme may lead to starvation of low priority applications. E-TFC selection (Enhanced Transport Format Combination selection) is done only in accordance to absolute logical channel priorities, i.e. the transmission of high priority data is maximized, which means that low priority data is possibly starved by high priority data. In order to avoid starvation the eNode B scheduler must have means to control from which radio bearers a user equipment transmits data. This mainly influences the design and use of the scheduling grants transmitted on the L1/L2 control channel in downlink. In the following the details of the uplink rate control procedure in LTE is outlined.

Uplink Rate Control/Logical Channel Prioritization Procedure

For UMTS long term evolution (LTE) uplink transmissions there is a desire that starvation be avoided and greater flexibility in resource assignment between bearers be possible, whilst retaining the per user equipment, rather than per user equipment bearer, resource allocation.

The user equipment has an uplink rate control function which manages the sharing of uplink resources between radio bearers. This uplink rate control function is also referred to as logical channel prioritization procedure in the following. The Logical Channel Prioritization (LCP) procedure is applied when a new transmission is performed, i.e. a transport block needs to be generated. One proposal for assigning capacity has been to assign resources to each bearer, in priority order, until each has received an allocation equivalent to the minimum data rate for that bearer, after which any additional capacity is assigned to bearers in, for example, priority order.

As will become evident from the description of the LCP procedure given below, the implementation of the LCP procedure residing in the user equipment is based on the token bucket model, which is well known in the IP world. The basic functionality of this model is as follows. Periodically and at a given rate, a token which represents the right to transmit a quantity of data is added to the bucket. When the user equipment is granted resources, it is allowed to transmit data up to the amount represented by the number of tokens in the bucket. When transmitting data the user equipment removes the number of tokens equivalent to the quantity of transmitted data. In case the bucket is full, any further tokens are discarded. For the addition of tokens it could be assumed that the period of the repetition of this process would be every TTI, but it could be easily lengthened such that a token is only added every second. Basically instead of every 1 ms a token is added to the bucket, 1000 tokens could be added every second.

In the following the logical channel prioritization procedure used in LTE Rel. 8 is described (see for further details: 3GPP TS 36.321, "Evolved Universal Terrestrial Radio Access (E-UTRA); Medium Access Control (MAC) protocol specification", version 8.5, available at http://www.3gpp.org and incorporated herein by reference).

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD). The idea behind prioritized bit rate is to support for each bearer, including low priority non-GBR bearers, a minimum bit rate in order to avoid a potential starvation. Each bearer should at least get enough resources in order to achieve the prioritized bit rate (PRB).

The UE shall maintain a variable $B_j$ for each logical channel j. $B_j$ shall be initialized to zero when the related logical channel is established, and incremented by the product PBR× TTI duration for each TTI, where PBR is Prioritized Bit Rate of logical channel j. However, the value of $B_j$ can never exceed the bucket size and if the value of $B_j$ is larger than the bucket size of logical channel j, it shall be set to the bucket size. The bucket size of a logical channel is equal to PBR× BSD, where PBR and BSD are configured by upper layers.

The UE shall perform the following Logical Channel Prioritization procedure when a new transmission is performed. The uplink rate control function ensures that the UE serves its radio bearer(s) in the following sequence:

1. All the logical channel(s) in decreasing priority order up to their configured PBR (according the number of tokens in the bucket which is denoted by $B_j$);

2. If any resources remain, all the logical channels are served in a strict decreasing priority order (regardless of the value of $B_j$) until either the data for that logical channel or the UL grant is exhausted, whichever comes first. Logical channels configured with equal priority should be served equally.

In case the PBRs are all set to zero, the first step is skipped and the logical channel(s) are served in strict priority order: the UE maximizes the transmission of higher priority data.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximize the transmission of data.

Even though for LTE Rel. 8 only a Prioritized Bit Rate (PBR) is used within the LCP procedure there could be also further enhancements in future releases. For example similar to the PBR, also a maximum bit rate (MBR) per GBR bearer and an aggregated maximum bit rate (AMBR) for all Non-GBR bearers could be provided to the user equipment. The MBR denotes bit rates of traffic per bearer while AMBR denotes a bit rate of traffic per group of bearers. AMBR applies to all Non-GBR SAE Bearers of a user equipment. GBR SAE Bearers are outside the scope of AMBR. Multiple SAE Non-GBR bearers can share the same AMBR. That is, each of those SAE bearers could potentially utilize the entire AMBR, e.g. when the other SAE bearers do not carry any traffic. The AMBR limits the aggregated bit rate that can be expected to be provided by the Non-GBR SAE bearers sharing the AMBR.

HARQ Protocol Operation for Unicast Data Transmissions

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet.

In LTE there are two levels of re-transmissions for providing reliability, namely, HARQ at the MAC layer and outer ARQ at the RLC layer. The outer ARQ is required to handle residual errors that are not corrected by HARQ that is kept simple by the use of a single bit error-feedback mechanism, i.e. ACK/NACK. An N-process stop-and-wait HARQ is employed that has asynchronous re-transmissions in the downlink and synchronous re-transmissions in the uplink. Synchronous HARQ means that the re-transmissions of HARQ blocks occur at pre-defined periodic intervals. Hence, no explicit signaling is required to indicate to the receiver the retransmission schedule. Asynchronous HARQ offers the flexibility of scheduling re-transmissions based on air interface conditions. In this case some identification of the HARQ process needs to be signaled in order to allow for a correct combing and protocol operation. In 3GPP, HARQ operations with eight processes is used in LTE Rel. 8. The HARQ protocol operation for Downlink data transmission will be similar or even identical to HSDPA.

In uplink HARQ protocol operation there are two different options on how to schedule a retransmission. Retransmissions are either scheduled by a NACK, synchronous non-adaptive retransmission, or explicitly scheduled by a PDCCH, synchronous adaptive retransmissions. In case of a synchronous non-adaptive retransmission the retransmission will use the same parameters as the previous uplink transmission, i.e. the retransmission will be signaled on the same physical channel resources respectively uses the same modulation scheme. Since synchronous adaptive retransmissions are explicitly scheduled via PDCCH, the eNode B has the possibility to change certain parameters for the retransmission. A retransmission could be for example scheduled on a different frequency resource in order to avoid fragmentation in the uplink, or the eNode B could change the modulation scheme or alternatively indicate user equipment what redundancy version to use for the retransmission. It should be noted that the HARQ feedback (ACK/NACK) and PDCCH signaling occurs at the same timing. Therefore user equipment only needs to check once whether a synchronous non-adaptive retransmission is triggered, only NACK is received, or whether the eNode B requests a synchronous adaptive retransmission, i.e. PDCCH is signaled.

L1/L2 Control Signaling

In order to inform the scheduled users about their allocation status, transport format and other data related information (e.g. HARQ), L1/L2 control signaling needs to be transmitted on the downlink along with the data. The control signaling needs to be multiplexed with the downlink data in a sub-frame (assuming that the user allocation can change from sub-frame to sub-frame). Here, it should be noted, that user allocation might also be performed on a TTI (Transmission Time Interval) basis, where the TTI length is a multiple of the sub-frames. The TTI length may be fixed in a service area for all users, may be different for different users, or may even by dynamic for each user. Generally, then the L1/2 control signaling needs only be transmitted once per TTI. The L1/L2 control signaling is transmitted on the Physical Downlink Control Channel (PDCCH). It should be noted that assignments for uplink data transmissions, uplink grants, are also transmitted on the PDCCH.

Generally, the PDCCH information sent on the L1/L2 control signaling may be separated into the Shared Control Information (SCI) and Dedicated Control Information (DCI).

Shared Control Information (SCI)

Shared Control Information (SCI) carries so-called Cat 1 information. The SCI part of the L1/L2 control signaling contains information related to the resource allocation (indication). The SCI typically contains the following information:

User identity, indicating the user which is allocated

RB allocation information, indicating the resources (Resource Blocks, RBs) on which a user is allocated. Note, that the number of RBs on which a user is allocated can be dynamic.

Duration of assignment (optional) if an assignment over multiple sub-frames (or TTIs) is possible Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI)

Dedicated Control Information (DCI) carries the so-called Cat 2/3 information. The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:

Cat 2: Modulation scheme, transport-block (payload) size (or coding rate), MIMO related information, etc. Note, either the transport-block (or payload size) or the code rate can be signaled. In any case these parameters can be calculated from each other by using the modulation scheme information and the resource information (number of allocated RBs).

Cat 3: HARQ related information, e.g. hybrid ARQ process number, redundancy version, retransmission sequence number L 1/L2 Control Signaling Information for Downlink Data Transmission Along with the downlink packet data transmission, L1/L2 control signaling is transmitted on a separate physical channel (PDCCH). This L1/L2 control signaling typically contains information on:

The physical channel resource(s) on which the data is transmitted (e.g. subcarriers or subcarrier blocks in case of OFDM, codes in case of CDMA). This information allows the user equipment (receiver) to identify the resources on which the data is transmitted.

The transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the user equipment (receiver) to identify the information bit size, the modulation scheme and the code rate in order to start the demodulation, the de-rate-matching and the decoding process. In some cases the modulation scheme maybe signaled explicitly.

HARQ information:
  Process number: Allows the user equipment to identify the HARQ process on which the data is mapped.
  Sequence number or new data indicator: Allows the user equipment to identify if the transmission is a new packet or a retransmitted packet.
  Redundancy and/or constellation version: Tells the user equipment, which hybrid ARQ redundancy version is used (required for de-rate-matching) and/or which modulation constellation version is used (required for demodulation)
user equipment Identity (user equipment ID): Tells for which user equipment the L1/L2 control signaling is intended for. In typical implementations this information is used to mask the CRC of the L1/L2 control signaling in order to prevent other user equipments to read this information.

L 1/L2 Control Signaling Information for Uplink Data Transmission

To enable an uplink packet data transmission, L1/L2 control signaling is transmitted on the downlink (PDCCH) to tell the user equipment about the transmission details. This L1/L2 control signaling typically contains information on:
  The physical channel resource(s) on which the user equipment should transmit the data (e.g. subcarriers or subcarrier blocks in case of OFDM, codes in case of CDMA).
  The transport format, the user equipment should use for the transmission. This can be the transport block size of the data (payload size, information bits size), the MCS (Modulation and Coding Scheme) level, the Spectral Efficiency, the code rate, etc. This information (usually together with the resource allocation) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
  Process number: Tells the user equipment from which hybrid ARQ process it should pick the data.
  Sequence number or new data indicator: Tells the user equipment to transmit a new packet or to retransmit a packet.
  Redundancy and/or constellation version: Tells the user equipment, which hybrid ARQ redundancy version to use (required for rate-matching) and/or which modulation constellation version to use (required for modulation).
user equipment Identity (user equipment ID): Tells which user equipment should transmit data. In typical implementations this information is used to mask the CRC of the L1/L2 control signaling in order to prevent other user equipments to read this information.

There are several different flavors how to exactly transmit the information pieces mentioned above. Moreover, the L1/L2 control information may also contain additional information or may omit some of the information. E.g.:
  HARQ process number may not be needed in case of a synchronous HARQ protocol.
  A redundancy and/or constellation version may not be needed if Chase Combining is used (always the same redundancy and/or constellation version) or if the sequence of redundancy and/or constellation versions is pre defined.
  Power control information may be additionally included in the control signaling.
  MIMO related control information, such as e.g. pre-coding, may be additionally included in the control signaling.
  In case of multi-codeword MIMO transmission transport format and/or HARQ information for multiple code words may be included.

For uplink resource assignments (PUSCH) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively MCS field has for example a size of 5 bits, which corresponds to 32 entries. 3 TF/MCS table entries are reserved for indicating RVs 1, 2 or 3. The remaining MCS table entries are used to signal the MCS level (TBS) implicitly indicating RVO. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. Three of the entries are reserved to signal an explicit modulation order, providing no Transport format (Transport block) info. For the remaining 29 entries modulation order and Transport block size info are signaled.

Semi-Persistent Scheduling (SPS)

In the downlink and uplink, the scheduling eNodeB dynamically allocates resources to user equipments at each transmission time interval via the L1/L2 control channel(s) (PDCCH(s)) where the user equipments are addressed via their specific C-RNTIs. The CRC of a PDCCH is masked with the addressed user equipment's C-RNTI (so-called dynamic PDCCH). Only a user equipment with a matching C-RNTI can decode the PDCCH content correctly, i.e. the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are scheduled, this kind of operation is referred to as semi-persistent scheduling (SPS), i.e. resources are allocated to the user equipment on a semi-persistent basis (semi-persistent resource allocation). The benefit is that PDCCH resources for initial HARQ transmissions are saved. For details on semi-persistent scheduling, see 3GPP TS 36.300, "Evolved Universal Terrestrial Radio Access (E-UTRA) and Evolved Universal Terrestrial Radio Access Network (E-UTRAN); Overall description; Stage 2 (Release 8)", version 8.7.0, section 11, January 2009 or 3GPP TS 36.321, section 5.10 both available at http://www.3gpp.org and incorporated herein by reference.

One example for a service, which might be scheduled using semi-persistent scheduling is Voice over IP (VoIP). Every 20 ms a VoIP packet is generated at the codec during a talk-spurt. Therefore eNode B could allocated uplink or respectively downlink resource persistently every 20 ms, which could be then used for the transmission of Voice over IP packets. In general, semi-persistent scheduling is beneficial for services with a predictable traffic behavior, i.e. constant bit rate, packet arrival time is periodic.

The user equipment also monitors the PDCCHs in a sub-frame where it has been allocated resources for an initial transmission persistently. A dynamic (scheduling) grant, i.e. PDCCH with a C-RNTI-masked CRC, can override a semi-persistent resource allocation. In case the user equipment finds its C-RNTI on the L1/L2 control channel(s) in the sub-frames where the sub-frame has a semi-persistent resource assigned, this L1/L2 control channel allocation overrides the semi-persistent resource allocation for that transmission time interval and the user equipment does follow the dynamic grant. When sub-frame doesn't find a dynamic grant it will transmit/receive according to the semi-persistent resource allocation.

The configuration of semi-persistent scheduling is done by RRC signaling. For example the periodicity, i.e. PS_PE-RIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the activation SPS PDCCH every semi-persistent scheduling interval (SPS interval). Essentially the user equipment stores the SPS activation PDCCH content and follows the PDCCH with the signaled periodicity.

Uplink Power Control

Uplink transmission power control in a mobile communication system serves an important purpose: it balances the need for sufficient transmitted energy per bit to achieve the required Quality-of-Service (QoS), against the needs to minimize interference to other users of the system and to maximize the battery life of the mobile terminal. In achieving this purpose, the role of the Power Control (PC) becomes decisive to provide the required SINR (Signal to Interference Noise Ratio) while controlling at the same time the interference caused to neighboring cells. The idea of classic PC schemes in uplink is that all users are received with the same SINR, which is known as full compensation. As an alternative, 3GPP has adopted for LTE the use of Fractional Power Control (FPC). This new functionality makes users with a higher path-loss operate at a lower SINR requirement so that they will more likely generate less interference to neighboring cells.

Detailed power control formulae are specified in LTE for the Physical Uplink Shared Channel (PUSCH), Physical Uplink Control Channel (PUCCH) and the Sounding Reference Signals (SRSs) (see section 5.1 of 3GPP TS 36.213, "Physical layer procedures (Release 8)", version 8.6.0, available at http://www.3gpp.org). The respective power control formula for each of these uplink signals follows the same basic principles. They can be considered as a summation of two main terms: a basic open-loop operating point derived from static or semi-static parameters signaled by the eNodeB, and a dynamic offset updated from sub-frame to sub-frame.

The basic open-loop operating point for the transmit power per resource block depends on a number of factors including the inter-cell interference and cell load. It can be further broken down into two components, a semi-static base level $P_0$, further comprised of a common power level for all user equipments (UEs) in the cell (measured in dBm) and a UE-specific offset, and an open-loop path-loss compensation component. The dynamic offset part of the power per resource block can also be further broken down into two components, a component dependent on the Modulation and Coding Scheme (MCS) and explicit Transmitter Power Control (TPC) commands.

The MCS-dependent component (referred to in the LTE specifications as $\Delta_{TF}$, where TF is short for Transport Format) allows the transmitted power per RB to be adapted according to the transmitted information data rate.

The other component of the dynamic offset is the UE-specific TPC commands. These can operate in two different modes:

accumulative TPC commands (available for PUSCH, PUCCH and SRS) and absolute TPC commands (available for PUSCH only).

For the PUSCH, the switch between these two modes is configured semi-statically for each user equipment by RRC signaling—i.e. the mode cannot be changed dynamically. With the accumulative TPC commands, each TPC command signals a power step relative to the previous level.

Formula (1) below shows the user equipment transmit power in dBm for the PUSCH:

$$P_{PUSCH}=\min[P_{MAX},10\cdot\log_{10}M+P_{0\_PUSCH}+\alpha\cdot PL+\Delta_{MCS}+f(\Delta_i)] \quad (1)$$

where:

$P_{MAX}$ is the maximum available transmit power of the user equipment, which is depending on the user equipment class and configuration by the network M is the number of allocated physical resource blocks (PRBs).

PL is the user equipment path loss derived at the UE-based on RSRP (Reference Signal Received Power) measurement and signaled RS (Reference Symbol) eNodeB transmission power.

$\Delta_{MCS}$ is an MCS-dependent power offset set by the eNodeB.

$P_{0\_PUSCH}$ is a UE-specific parameter (partially broadcasted and partially signaled using RRC).

$\alpha$ is cell-specific parameter (broadcasted on BCH).

$\Delta_i$ are closed loop PC commands signaled from the eNodeB to the user equipment function $f(\ )$ indicates whether closed loop commands are relative accumulative or absolute. The function $f(\ )$ is signaled to the user equipment via higher layers.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components which are currently under consideration for LTE-Advanced (LTE-A for short) are described in the following.

LTE-A Support of Wider Bandwidth

Carrier aggregation, where two or more component carriers are aggregated, is considered for LTE-A in order to support wider transmission bandwidths e.g. up to 100 MHz and for spectrum aggregation.

A terminal may simultaneously receive or transmit on one or multiple component carriers depending on its capabilities:

An LTE-A terminal with reception and/or transmission capabilities for carrier aggregation can simultaneously receive and/or transmit on multiple component carriers. There is one Transport Block (in absence of spatial multiplexing) and one HARQ entity per component carrier.

An LTE Rel. 8 terminal can receive and transmit on a single component carrier only, provided that the structure of the component carrier follows the Rel. 8 specifications.

It shall be possible to configure all component carriers LTE Rel. 8 compatible, at least when the aggregated numbers of component carriers in the uplink and the downlink are same. Consideration of non-backward-compatible configurations of LTE-A component carriers is not precluded.

At present, LTE-A supports carrier aggregation for both contiguous and non-contiguous component carriers with each component carrier limited to a maximum of 110 Resource Blocks (RBs) in the frequency domain, using the LTE Rel. 8 numerology. It is possible to configure a user equipment to aggregate a different number of component carriers originating from the same eNodeB. Please note that component carriers originating from the same eNodeB do no necessarily need to provide the same coverage.

Furthermore, a user equipment may be configured with different bandwidths in the uplink and the downlink:

The number of downlink component carriers that can be configured depends on the downlink aggregation capability of the user equipment;

The number of uplink component carriers that can be configured depends on the uplink aggregation capability of the user equipment;

It is not possible to configure a user equipment with more uplink component carriers than downlink component carriers;

In typical TDD deployments, the number of component carriers and the bandwidth of each component carrier in uplink and downlink is the same.

The spacing between centre frequencies of contiguously aggregated component carriers is a multiple of 300 kHz. This is in order to be compatible with the 100 kHz frequency raster of LTE Rel. 8 and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For uplink and for downlink there is one HARQ entity required in MAC for each aggregated component carrier. There is (in the absence of Single User-Multiple Input Multiple Output (SU-MIMO) for uplink) at most one transport block per component carrier. A transport block and its potential HARQ retransmissions need to be mapped on the same component carrier. The Layer 2 structure with configured carrier aggregation is shown in FIG. 17 and FIG. 18 for the downlink and uplink respectively.

When carrier aggregation is configured, the user equipment has only one RRC connection with the network. At RRC connection establishment/re-establishment, one cell provides the security input (one ECGI, one PCI and one ARFCN) and the non-access stratum (NAS) mobility information (e.g. tracking area identifier (TAI)), similar to LTE Rel. 8. After RRC connection establishment/re-establishment, the component carrier corresponding to that cell is referred to as the Downlink Primary Component Carrier (DL PCC) in the downlink. There is always only one DL PCC and one UL PCC configured per user equipment in connected mode. Within the configured set of component carriers, other component carriers are referred to as Secondary Component Carriers (SCCs).

The characteristics of the DL PCC and UL PCC are:

The UL PCC is used for transmission of Layer 1 (L1) uplink control information;

The DL PCC cannot be de-activated;

Re-establishment of the DL PCC is triggered when the DL PCC experiences Radio Link Failure (RLF), but not when DL SCCs experience RLF;

The DL PCC cell can change with handover;

NAS information is taken from the DL PCC cell.

The reconfiguration, addition and removal of component carriers can be performed by RRC signaling. At intra-LTE handover, RRC can also add, remove, or reconfigure component carriers for usage in the target cell. When adding a new component carrier, dedicated RRC signaling is used for sending component carrier's system information which is necessary for component carrier transmission/reception (similarly as in LTE Rel.8 for handover).

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats (called "CIF"). A linking between uplink and downlink component carriers allows identifying the uplink component carrier for which the grant applies when there is no-cross-carrier scheduling. The linkage of downlink component carriers to uplink component carriers does not necessarily need to be one to one. In other words, more than one downlink component carrier can link to the same uplink component carrier. At the same time, a downlink component carrier can only link to one uplink component carrier.

(De)Activation of a Component Carrier and DRX Operation

In carrier aggregation, whenever a user equipment is configured with only one component carrier, LTE Rel. 8 DRX operation applies. In other cases, the same DRX operation applies to all configured and activated component carriers (i.e. identical active time for PDCCH monitoring). When in active time, any component carrier may always schedule PDSCH on any other configured and activated component carrier.

To enable reasonable UE battery consumption when carrier aggregation is configured, a component carrier activation/deactivation mechanism for downlink SCCs is introduced (i.e. activation/deactivation does not apply to the PCC). When a downlink SCC is not active, the UE does not need to receive the corresponding PDCCH or PDSCH, nor is it required to perform CQI measurements. Conversely, when a downlink SCC is active, the user equipment should receive the PDSCH and PDCCH (if present), and is expected to be able to perform CQI measurements. In the uplink however, a user equipment is always required to be able to transmit on the PUSCH on any configured uplink component carrier when scheduled on the corresponding PDCCH (i.e. there is no explicit activation of uplink component carriers).

Other details of the activation/deactivation mechanism for SCCs are:
Explicit activation of DL SCCs is done by MAC signaling;
Explicit deactivation of DL SCCs is done by MAC signaling;
Implicit deactivation of DL SCCs is also possible;
DL SCCs can be activated and deactivated individually, and a single activation/deactivation command can activate/deactivate a subset of the configured DL SCCs;
SCCs added to the set of configured CCs are initially "deactivated".

As already outlined above in LTE Rel. 8 uplink scheduling, respectively QoS control for uplink transmissions is solely controlled by the eNode B. A user equipment follows the scheduling decision made by eNode B signaled by means of scheduling grants on the PDCCH to the user equipment. The eNode B selects the HARQ operation point, i.e. the target Block Error Rate (BLER), based on the QoS requirements of the logical channels which are included in an uplink transmission. For example, the block error rate of an delay-critical service like VoIP is different compared to a best-effort services which is not delay-sensitive.

Similarly the HARQ operation strategy, e.g. number of scheduled HARQ retransmissions by the eNodeB, is also determined depending on the QoS requirements of the logical channels included in an uplink transmission, i.e. transport block. Again for a delay-critical service like VoIP the number of scheduled retransmissions by the eNodeB will be less compared to a best-effort service.

Basically it can be concluded that in order to allow for an efficient QoS control of uplink transmissions, the eNodeB needs to know data of which logical channels will be included in a transport block. Essentially, the eNodeB needs to know how user equipment shares the resources assigned by a scheduling grant among the configured radio bearers when generating a transport block. As already mentioned the Buffer Status Reporting procedure is used to provide the eNodeB with information about the amount of data available for transmission in the uplink buffers of the user equipment. The reporting is done periodically and event-triggered.

Ideally the eNodeB knows the user equipment's buffer status and can therefore re-enacts the logical channel prioritization procedure performed by user equipment when making a scheduling decision. This ensures that the eNodeB knows what kind of logical channels will be included in a scheduled uplink transmission and hence allows for choosing a correct block error rate respectively HARQ operation strategy. Since there is only one transport bock per TTI for UL-SCH transmissions in LTE Rel. 8 it can be concluded that in LTE Rel. 8 an efficient QoS control/uplink scheduling is possible.

However when now considering LTE-A where bandwidth aggregation is supported there multiple transport blocks can be transmitted in one TTI in the uplink. As explained before a LTE-A-capable user equipment can receive multiple uplink resource assignments for different component carriers in one TTI. Consequently the user equipment needs to transmit in one TTI multiple transport blocks, on the different component carriers in the uplink, i.e. there will be only one transport block (TB) (in absence of spatial multiplexing) per component carrier.

Due to the fact that in LTE-A there might be more than one transport block per TTI in the uplink, there is basically one more degree of freedom when generating the transport blocks in the user equipment. When the eNodeB doesn't know the order in which the user equipment processes the received uplink resource assignments, i.e. in which order user equipment generates the transport blocks, the eNodeB consequently cannot know the content of a transport block generated by the user equipment. Essentially, the eNodeB is not aware of how the user equipment maps the data of the different logical channels to the different transport blocks. Therefore, it's also not possible to efficiently control the QoS of uplink transmissions since this would require the knowledge of the logical channels included in a transport block at the eNodeB. For example, the eNodeB might schedule a huge number of HARQ retransmissions for a given transport block under the assumption that the transport block contains data of a best effort service even though the user equipment actually put data of some delay-critical service like a VoIP packet in this transport block. This would obviously lead to an inefficient usage of the uplink resources.

SUMMARY OF THE INVENTION

One object of the invention is to propose strategies and methods for generating plural transport blocks within a given time constraint. Advantageously, these strategies and methods may facilitate the generation of the transports blocks within a time constraint as short as 4 ms between receiving uplink resource assignments and the transmission of the transport blocks on the resources allocated by the uplink resource assignments.

A further object of the invention is to propose schemes allowing a scheduler to gain additional knowledge of the content of transport blocks transmitted on uplink resources allocated by plural uplink resource assignments to facilitate more efficient scheduling of the uplink transmissions.

Another object of the invention is to propose strategies how a mobile terminal utilizes the transmit power available for uplink transmissions of plural transport blocks within a transmission time interval in case a mobile terminal is power limited, i.e. the transmit power that would be required for the transmission of the plural transport blocks within the transmission time interval according to the uplink resources assignments is exceeding the transmit power available for uplink transmissions within a transmission time interval.

At least one of these objects is solved by the subject matter of the independent claims. Advantageous embodiments are subject to the dependent claims.

A first aspect of the invention is the prioritization of the power allocation for individual transport blocks corresponding to plural uplink resource assignments within power control. This aspect is particularly applicable to situations where the mobile terminal is power limited. According to this aspect of the invention, the order of processing the uplink resource assignments (priority order) on the uplink component carriers is used to determine power scaling for the power allocation of the individual transport blocks to be transmitted on the respective component carriers in the uplink. In power limited situations, the mobile terminal reduces the transmit power for the transmission of each of the transport blocks according to the priority of the respective transport block given by the priority order, such that the total transmit power spent for the transmissions of the transport blocks becomes smaller or equal to a maximum transmit power available to the mobile terminal for transmitting the transport blocks.

According to one exemplary implementation the transmit power scaling is reducing the transmit power is taking into account the priority of the resource assignment of a respective transport block/component carrier on which the respective transport block is to be transmitted, as given by the priority/processing order in that transmission of transport blocks having high priority should be least effected by the transmit power reduction. Advantageously, the lower (higher) the priority of the resource assignment/component carrier according to the priority order, the larger (smaller) the power reduction applied to the transmit power for the transport block required by its corresponding uplink resource assignment. Ideally, the transmission power of high priority transport blocks should not be reduced, if possible, but rather the transmit power reduction to meet a maximum transmit power available to the mobile terminal for transmitting the transport blocks should be first tried to be obtained by limiting the transmit power for transmissions of low priority transport blocks.

A second aspect of the invention is the introduction of a prioritization of the uplink resource assignments, so that multiple uplink resource assignments can be ranked in the mobile terminal in a priority order. The prioritization of the uplink resource assignments is used to determine the order in which the uplink resource assignments are processed respectively the individual transport blocks corresponding to the uplink resource assignments are filled, respectively how the data of different logical channels is multiplexed to the transport blocks for transmission in the uplink.

The first, second and third aspect of this invention can be readily combined with each other and may use the same priority/processing order of the resource assignments in transport block generation (logical channel prioritization) and power scaling of the transmissions of the generated transport blocks in the uplink.

According to one exemplary embodiment of the invention in line with the first aspect of the invention, a method for controlling the transmit power of transmissions of transport blocks on uplink component carriers of a mobile communication system in a power limited situation is provided. In this method a mobile terminal receives uplink resource assignments scheduling transmissions of the transport blocks on the uplink component carriers within a transmission time interval. The uplink resource assignments have a given priority order. The mobile terminal further determines for each transmission of a respective one of the transport blocks, a transmit power required for transmitting the respective transport block according to its corresponding uplink resource assignment. Furthermore, the mobile terminal reduces this determined transmit power for each transmission of a respective one of the transport blocks according to the priority of the transport block given by the priority order, and transmits the transport blocks on the uplink component carriers within the transmission time interval, wherein each transport block is transmitted using the reduced transmit power.

As indicated above, in one exemplary implementation, the mobile terminal may determine for the transmission of each transport block i of the transport blocks, a scaling factor $s_i$, where $s_i \in [0, \ldots, 1]$. The determination of the respective scaling factor $s_i$ for each of the transport blocks is based on the priority of the resource assignment corresponding to the respective transport block i as given by the priority order. When reducing the transmit power, the transmit power for each transmission of a respective one of the transport blocks is scaled according to the respective scaling factor $s_i$ of the transmission. In case the scaling factor $s_i=0$, this means that the uplink resource assignment is not utilized, i.e. the mobile terminal performs a DTX on the uplink component carrier. In case the scaling factor $s_i=1$, this means that there is no reduction of the transmit power, but the mobile terminal uses the transmit power required for transmitting the respective transport block as determined by the power control formula.

In a more detailed implementation, the scaling factors $s_i$ for the transport blocks are determined by the mobile terminal such that the sum of the required transmit powers scaled by the scaling factors $s_i$ for the transmissions of the transport blocks is smaller or equal to a maximum transmit power available to the mobile terminal for transmitting the transport blocks. The maximum transmit power available to the mobile terminal may be for example defined as the maximum transmit power the mobile terminal is allowed to use for uplink transmissions as configured by the network, minus the transmit power required for by the mobile terminal for control signaling on the physical uplink control channel within the transmission time interval in which the transport blocks are transmitted.

Furthermore, in another exemplary embodiment of the invention, the transmit power for each transmission of a respective one of the transport blocks is reduced inversely proportional to the priority of the resource assignment of a respective transport block as given by the priority order.

In another exemplary embodiment of the invention, the mobile terminal further generates the transport blocks for transmission. This generation of the transport blocks includes multiplexing data of different logical channels to the transport blocks according to the priority/processing order of their corresponding uplink resource assignments. The transport block generation may be implemented according to one of the various exemplary embodiment of the invention related to the second aspect of the invention as provided herein.

According to one exemplary embodiment of the invention in line with the second aspect of the invention, a method for generating transport blocks for uplink transmission via an air interface in a mobile communication system is provided. In this method, a mobile terminal (e.g. a user equipment in a 3GPP LTE-A system) receives plural uplink resource assignments in one transmission time interval (TTI) on a control channel for allocating respective radio resources for uplink transmission to the mobile terminal. The uplink resource assignments are ranked according to a priority order. Further, the mobile terminal generates respective transport blocks for transmission on the allocated respective radio resources. Thereby, the data of different logical channels is multiplexed to the transport blocks according to the priority order of their corresponding uplink resource assignment.

In more detail, the multiplexing of the data to the transport blocks in the given priority order of their corresponding uplink resource assignments could be for example realized in that the transport blocks are sequentially filled with data of the logical channels in the priority order of their corresponding uplink resource assignments and logical channel priorities. Thereby, resource assignments allocating uplink radio resources on semi-persistently could have the highest priority.

In another exemplary embodiment, the priority order of the uplink resource assignments is determined by the mobile terminal based on at least one parameter included in each uplink resource assignment. For example, the parameter is one of or a combination of a modulation and coding scheme level indicated in a respective one of the uplink resource assignments, the transport block size indicated by a respective uplink resource assignments, and a scheduling mode indicated by a respective uplink resource assignments. Please note that in order to obtain an unambiguous priority order of the of the uplink resource assignments, respectively the transport blocks on the corresponding component carriers, the mobile terminal may sequentially prioritize the uplink resource assignments based on different parameters included therein.

There are different possibilities how the mobile terminal can be made aware of the priority order of the uplink resource assignments. For example, in one embodiment of the invention the priority order of the uplink resource assignments is determined based on the priority indicated for each uplink resource assignment. For example, the priority of an uplink resource assignment could be comprised within the uplink resource assignment itself. In one exemplary implementation the control channel conveying the uplink resource assignments comprises a field for indicate their respective priority. In a further, more advanced implementation this field is used to indicate the priority only for allocations of initial transmission of a transport block, and the field may optionally be reused for the signaling of other control information, if the uplink resource assignment is related to a retransmission of a transport block.

In a further exemplary embodiment of the invention, each uplink component carrier is assigned a carrier indicator. In this embodiment the mobile terminal can determine the priority order of the uplink resource assignments by the carrier indicators of the component carriers scheduled by the uplink resource assignments.

For example, the component carrier indicators may be determined by the network (e.g. the eNodeB) in a fashion that the lower the component carrier indicator the higher/lower the priority of the data transmitted thereon (and thus the uplink resource assignment). The mobile terminal could thus simply order the uplink resource assignments according to the carrier indicators of the component carriers on which they assign resources in order to obtain the priority order in which the resource assignments are to be processed.

In an alternative embodiment of the invention, each uplink resource assignment is allocating radio resources on one of plural component carriers and the component carriers are assigned respective priorities. In this case the priority order of the uplink resource assignments may be determined according to the priorities of the component carriers on which resources are allocated by the uplink resource assignments. For example, higher layer signaling, such as MAC control signaling or radio resource control (RRC) signaling could be utilized to signal the priority order of the component carriers to the mobile terminal.

In another alternative embodiment of the invention, the priority order of the uplink resource assignments is given by their transmission timing on the control channel.

A further alternative implementation according to another embodiment of the invention is that the priority of each uplink resource assignment is determined by the type of the component carrier to which it pertains, and the priority order is determined based on the priorities of the uplink resource assignments. For example, in one implementation, an uplink resource assignment received for the uplink primary component carrier has the highest priority and is processed before any uplink resource assignment received for an uplink secondary component carrier.

A further, third aspect of the invention is the generation process of the transport blocks. The invention is proposing different optimized logical channel prioritization procedures that can handle plural uplink resource assignments for uplink transmissions in a given transmission time interval or subframe. One of the proposed optimized logical channel prioritization procedures is employing a virtual transport block so that the logical channel prioritization procedure can be jointly performed for all uplink resource assignments received simultaneously. Another approach suggested herein is the parallelization of logical channel prioritization procedures. In this approach also the concept of virtual transport blocks is used, but still multiple logical channel prioritization procedures for subsets of the uplink resource assignments are performed in parallel.

In accordance with this third aspect of the invention, a further embodiment is relating to a method for generating transport blocks based on the priority order of their corresponding uplink resource assignments. Each uplink resource assignments can be considered to yield a transport block size. In this method, the transport block sizes yielded by the uplink resource assignments are first accumulated to obtain a virtual transport block size of a virtual transport block. Next, one joint logical channel prioritization procedure over all uplink resource assignments is performed to thereby fill the virtual transport block with data of logical channels according to their logical channel priority. Subsequently, the virtual transport block is divided into transport blocks to match the uplink resource assignments.

This division is performed such that the sizes of the transport blocks correspond to transport block sizes of their uplink resource assignments and the virtual transport block is divided into the transport blocks according to the priority order of the uplink resource assignments. This may be for example implemented such that higher priority data of the virtual transport blocks (i.e. data from logical channels with high logical channel priorities) is mapped to the transport block or blocks transmitted on uplink resources allocated by high priority uplink resource assignment(s), and vice versa. In this method, the transport blocks may be sequentially filled with data of the virtual transport block in the priority order of their corresponding uplink resource assignments.

Expressed more mathematically, it may be assumed that there are n uplink resource assignments $RA_i$, $i \in [1, \ldots, n]$ yielding respective transport block sizes $TBS_i$, $i \in [1, \ldots, n]$. Furthermore, the virtual transport size is $$vTBS = \sum_{i=1}^{n} TBS_i.$$

The virtual transport block can be represented by a sequence of bits $[B_0, \ldots, B_{vTBS-1}]$. Similarly, the n transport blocks corresponding to the n uplink resource assignments can be represented by sequences of bits $[b_0^i, \ldots, b_{TBS_i-1}^i]$, $i \in [1, \ldots, n]$. In one embodiment of the invention, the virtual transport block is divided into the n transport blocks, such that $$[b_0^i, \ldots, b_{TBS_i-1}^i] = [B_{\sum_{k=1}^{i} TBS_{k-1}}, \ldots, B_{\sum_{k=1}^{i} TBS_{k-1} + TBS_i - 1}]$$

where $TBS_0 = 0$ and $i \in [1, \ldots, n]$.

In a further embodiment of the invention, the generation of the transport blocks considers MAC control elements that need to be sent within the transport blocks in addition to the logical channel data. Accordingly, in one example, when dividing the virtual transport block into transport blocks one or more MAC control elements to the transport blocks are added thereto based on the type of the respective MAC control element(s). For instance, a respective MAC control element can be either categorized as a mobile terminal-specific MAC control element or as a component carrier-specific MAC control element, and the transport block to which the respective MAC control element is added depends on whether it is component carrier-specific ("component carrier-specific type") or mobile terminal-specific ("mobile terminal-specific type").

In one exemplary implementation, it can be again assumed that the uplink resource assignments are ranked according to a priority order. The mobile terminal-specific MAC control elements may be for example transmitted in the transport block on the component carrier on which resources are allocated by the highest priority uplink resource assignment. Alternatively, all MAC control elements may be transmitted in the transport block on the component carrier on which resources are allocated by the highest priority uplink resource assignment (of course given that the transport block size is sufficiently large for transporting all MAC control elements, which should however be the case in most practical scenarios).

Furthermore, there may also be a rule for component carrier-specific MAC control elements defined. For example, each respective component carrier-specific MAC control element is transmitted in a transport block on a component carrier to which the content of a respective component carrier-specific MAC control element is referring to.

As indicated above, still accordance with the third aspect of the invention, another embodiment of the invention is proposing an alternative method for generating transport blocks based on the priority order of their corresponding uplink resource assignment. In this method the logical channels having data pending for uplink transmission are grouped according to their logical channel priorities to obtain a number of n logical channel groups. The number of n logical channel groups corresponds to a number of n logical channel prioritization procedures that can be performed in parallel by a mobile terminal. Somewhat similar to the previous method, the transport block sizes yielded by the uplink resource assignments are accumulated according to a priority order of their corresponding uplink resource assignments to obtain a number of n virtual transport block sizes of virtual transport blocks. Furthermore, each virtual transport block is associated to a logical channel group. Next, n logical channel prioritization procedures are performed by the mobile terminal in parallel. A joint logical channel prioritization procedure is performed for each virtual transport block to thereby fill the virtual transport block with data of logical channels of the associated logical channel group. The virtual transport blocks obtained by the n logical channel prioritization procedures are then divided into transport blocks, wherein the sizes of the transport blocks correspond to transport block sizes of their uplink resource assignments.

Please note that when accumulating the transport block sizes yielded by the uplink resource assignments to obtain the n virtual transport blocks, a virtual transport block may be formed by accumulating one or more uplink resource assignments. For example, if there are three uplink resource assignments, and there are two virtual transport blocks to be formed, for example, the highest priority uplink resource assignment could define the transport block of the (highest priority/ranked) first virtual transport block, while the remaining two uplink resource assignments are accumulated to form a second (lower priority/ranked) virtual transport block. Similarly, the division of the virtual transport blocks into transport blocks corresponding in size to the respective uplink resource assignments may not be required each virtual transport block. In the example above, the (highest priority/ranked) first virtual transport block is corresponding in its size to the transport block size yielded by the highest priority uplink resource assignment, so that the virtual transport block and the transport block for this highest priority uplink resource assignment is equivalent. For the (lower priority/ranked) virtual transport block, two uplink resource assignments have been accumulated, so that the virtual transport block is to be divided into two transport blocks with transport block sizes corresponding to the two uplink resource assignments respectively.

In one exemplary implementation according to another embodiment of the invention, when performing the n logical channel prioritization procedures, MAC control elements may be added to the transport blocks in each of the n logical channel prioritization procedures as described above and will be outlined in more detail herein below.

In a more detailed implementation according to another embodiment of the invention, the mobile terminal is assumed to be able to process up to an integer number of l logical channels per logical channel prioritization procedure while meeting a time constraint for the generation of the transport blocks. The mobile terminal is further assumed to be able to perform j logical channel prioritization procedures in parallel while meeting said time constraint. In this embodiment, the generation method for the transport blocks ensures that a maximum of l logical channels is grouped into a respective one of the first n−1 logical channel groups in ascending order of their logical channel priorities, and that the association of logical channel groups and virtual transport blocks is such that the logical channel groups carrying the highest logical channel priority data is associated to the virtual transport block accumulating the transport block sizes yielded by the highest priority uplink resource assignments, and such that the logical channel groups carrying the lowest logical channel priority data is associated to the virtual transport block accumulating the transport block sizes yielded by the lowest priority uplink resource assignments.

Another aspect of the invention is related to the implementation of the methods for controlling the transmit power of transmissions and for generating transport blocks in hardware and software. In accordance with the first aspect of the invention, a mobile terminal for controlling the transmit power of transport blocks to be transmitted on uplink component carriers of a mobile communication system in a power limited situation is provided. This mobile terminal comprises a receiver unit for receiving uplink resource assignments scheduling transmissions of the transport blocks on the uplink component carriers within a transmission time interval, wherein the uplink resource assignments have a priority order, and a processing unit for determining for each transmission of a respective one of the transport blocks, a transmit power required for transmitting the respective transport block according to its corresponding uplink resource assignment. The mobile terminal also has a power control unit for reducing the determined transmit power for each transmission of a respective one of the transport blocks according to the priority of the transport block given by the priority order, and a transmitter for transmitting the transport blocks on the uplink component carriers within the transmission time interval, wherein each transport block is transmitted using the reduced transmit power.

According to another exemplary embodiment of the invention, the processing unit of the mobile terminal determines for the transmission of each transport block i of the transport blocks, a scaling factor $s_i$, where $s_i \in [0, \ldots, 1]$. The determination of the respective scaling factor $s_i$ for each of the transport blocks is thereby based on the priority of the resource assignment corresponding to the respective transport block i as given by the priority order. Moreover, the power control unit scales for each transmission of a respective one of the transport blocks the determined transmit power according to the priority of the transport block given by the priority order.

The mobile terminal's power control unit may reduce the required transmit power for each transmission of a respective one of the transport blocks inversely proportional to the priority of the uplink resource assignment of a respective transport block as given by the priority order.

In another exemplary embodiment of the invention, the receiver of the mobile terminal receives the uplink resource assignments on a control channel, and wherein the uplink resource assignments are allocating respective radio resources for uplink transmission to the mobile terminal. The mobile terminal further comprises a transport block generation unit for generating respective transport blocks for transmission on the allocated respective radio resources, wherein the data of different logical channels is multiplexed to the transport blocks according to the priority order of their corresponding uplink resource assignment.

Another embodiment of the invention, in line with the second aspect of the invention, is providing a mobile terminal for generating transport blocks for uplink transmission via an air interface in a mobile communication system. This mobile terminal comprises a receiver that receives at a mobile terminal plural uplink resource assignments on a control channel in one transmission time interval for allocating respective radio resources for uplink transmission to the mobile terminal. As indicated above, the uplink resource assignments are ranked according to a priority order. The mobile terminal is further equipped with a transport block generation unit that is generating respective transport blocks for transmission on the allocated respective radio resources. The unit ensures that data of different logical channels is multiplexed to the transport blocks according to the priority order of their corresponding uplink resource assignment.

In a further embodiment of the invention, the mobile terminal comprises a transmitter for transmitting the generated transport blocks within a transmission time interval on plural component carriers. The transmitter may be further adapted to transmit the transport blocks via a shared uplink channel on radio resources allocated by the resource assignments.

According to another embodiment of the invention the mobile terminal's receiver is adapted to receive information on the priority order of the uplink resource assignments via MAC control signaling or radio resource signaling. For instance, the priority order could be signaled within a MAC control element of a MAC message or within an Information Element (IE) of a RRC message.

Another exemplary embodiment of the invention is related to a transport block generation unit for generating transport blocks based on the priority order of their corresponding uplink resource assignments. The transport block generation unit comprises an accumulation unit for accumulating the transport block sizes yielded by the uplink resource assignments to obtain a virtual transport block size of a virtual transport block. Further, it comprises a logical channel prioritization unit for performing a joint logical channel prioritization procedure over all uplink resource assignments to thereby fill the virtual transport block with data of logical channels according to their logical channel priority, and a division unit for dividing the virtual transport block into transport blocks, wherein the sizes of the transport blocks correspond to transport block sizes of their uplink resource assignments and the virtual transport block is divided into the transport blocks according to the priority order of the uplink resource assignments.

The transport block generation unit according to a further exemplary embodiment of the invention comprises a dividing unit that sequentially fills the transport blocks with data of the virtual transport block in the priority order of their corresponding uplink resource assignments.

In another embodiment, the logical channel prioritization unit comprises a MAC control element mapping unit that is adapted to map MAC control element(s) to be transmitted within the transport blocks to the transport blocks. The MAC control element mapping unit is thereby adapted to decide based on the type of a respective MAC control element to which of the transport blocks the MAC control element should be mapped. For instance, the MAC control element mapping unit determines for a respective MAC control element whether it is of component carrier-specific type or mobile terminal-specific type, and performs a mapping of the control element to the correct transport block based on this determination.

In one exemplary implementation according to a further embodiment of the invention, it can be again assumed that the uplink resource assignments are ranked according to a priority order. The MAC control element mapping unit is adapted to map mobile terminal-specific MAC control elements may be for example to the transport block on the component carrier on which resources are allocated by the highest priority uplink resource assignment. Alternatively, the MAC control element mapping unit is adapted to map all MAC control elements to the transport block on the component carrier on which resources are allocated by the highest priority uplink resource assignment (of course given that the transport block size is sufficiently large for transporting all MAC control elements, which should however be the case in most practical scenarios).

Furthermore, there may also be a rule for component carrier-specific MAC control elements defined. For example, the MAC control element mapping unit could be adapted to map each respective component carrier-specific MAC control element to a transport block on a component carrier to which the content of a respective component carrier-specific MAC control element is referring to.

In an alternative embodiment of the invention, a transport block generation unit is provided that generates transport blocks based on the priority order of their corresponding uplink resource assignments. According to this embodiment of the invention, the transport block generation unit comprises a grouping unit for grouping logical channels having data pending for uplink transmission according to their logical channel priorities to obtain a number of n logical channel groups. The number of n logical channel groups corresponds to a number of n logical channel prioritization procedures that can be performed in parallel by the transport block generation unit.

The transport block generation unit further comprises an accumulation unit for accumulating the transport block sizes yielded by the uplink resource assignments according to a priority order of their corresponding uplink resource assignments to obtain a number of n virtual transport block sizes of virtual transport blocks, and a processing unit for associating each virtual transport block to a logical channel group. Moreover, it includes a logical channel prioritization unit for performing n logical channel prioritization procedures in parallel, wherein the logical channel prioritization unit performs a joint logical channel prioritization procedure for each virtual transport block and to thereby fill the virtual transport block with data of logical channels of the associated logical channel group. Moreover, this transport block generation unit also includes a dividing unit for dividing the virtual transport blocks into transport blocks, wherein the sizes of the transport blocks correspond to the transport block sizes of their uplink resource assignments.

In a more detailed embodiment of the invention, the transport block generation unit is adapted to process an integer number of l logical channels per logical channel prioritization procedure while meeting a time constraint for the generation of the transport blocks, and wherein the transport block generation unit is adapted to perform j logical channel prioritization procedures in parallel while meeting said time constraint. The grouping unit groups a maximum of l logical channels into a respective one of the first n−1 logical channel groups in ascending order of their logical channel priorities. The processing unit further associates the logical channel groups and virtual transport blocks such that the logical channel groups carrying the highest logical channel priority data is associated to the virtual transport block accumulating the transport block sizes yielded by the highest priority uplink resource assignments, and such that the logical channel groups carrying the lowest logical channel priority data is associated to the virtual transport block accumulating the transport block sizes yielded by the lowest priority uplink resource assignments.

Another embodiment of the invention is related to a computer readable medium storing instructions that, when executed by a processor of a mobile terminal, cause the mobile terminal to control the transmit power of transmissions and/or to generate transport blocks for uplink transmission via an air interface in a mobile communication system. In one exemplary embodiment of the invention in line with the first aspect of this invention, the instructions, when executed by a processor of a mobile terminal, cause the mobile terminal to control the transmit power of transport blocks to be transmitted on uplink component carriers of a mobile communication system in a power limited situation by receiving uplink resource assignments scheduling transmissions of the transport blocks on the uplink component carriers within a transmission time interval, wherein the uplink resource assignments have a priority order. Furthermore, the mobile terminal is caused to determine for each transmission of a respective one of the transport blocks, a transmit power required for transmitting the respective transport block according to its corresponding uplink resource assignment, and to reduce the determined transmit power for each transmission of a respective one of the transport blocks according to the priority of the transport block given by the priority order. The execution of the instructions further cause the mobile terminal to transmit the transport blocks on the uplink component carriers within the transmission time interval, wherein each transport block is transmitted using the reduced transmit power.

In another embodiment of the invention, which is in line with the second aspect of the invention, the execution of the instructions on the computer-readable medium by the processor cause the mobile terminal to generate transport blocks for uplink transmission via an air interface in a mobile communication system, by receiving at a mobile terminal plural uplink resource assignments on a control channel in one transmission time interval for allocating respective radio resources for uplink transmission to the mobile terminal, wherein the uplink resource assignments are ranked according to a priority order, and generating respective transport blocks for transmission on the allocated respective radio resources, wherein the data of different logical channels is multiplexed to the transport blocks according to the priority order of their corresponding uplink resource assignment.

Another readable medium according to a further embodiment of the invention stores instructions that, when executed by a processor of a mobile terminal, cause the mobile terminal to generate transport blocks based on the priority order of their corresponding uplink resource assignments, each uplink resource assignments yielding a transport block size, by accumulating the transport block sizes yielded by the uplink resource assignments to obtain a virtual transport block size of a virtual transport block, performing a joint logical channel prioritization procedure over all uplink resource assignments to thereby fill the virtual transport block with data of logical channels according to their logical channel priority, and dividing the virtual transport block into transport blocks, wherein the sizes of the transport blocks correspond to transport block sizes of their uplink resource assignments and the virtual transport block is divided into the transport blocks according to the priority order of the uplink resource assignments.

In another embodiment, a computer readable medium stores instructions that, when executed by a processor of a mobile terminal, cause the mobile terminal to generate transport blocks based on the priority order of their corresponding uplink resource assignments, each uplink resource assignment yielding a transport block size, by grouping logical channels having data pending for uplink transmission according to their logical channel priorities to obtain a number of n logical channel groups, wherein the number of n logical channel groups corresponds to a number of n logical channel prioritization procedures that can be performed in parallel by mobile terminal, accumulating the transport block sizes yielded by the uplink resource assignments according to a priority order of their corresponding uplink resource assignments to obtain a number of n virtual transport block sizes of virtual transport blocks, associating each virtual transport block to a logical channel group, performing n logical channel prioritization procedures in parallel, wherein a joint logical channel prioritization procedure is performed for each virtual transport block to thereby fill the virtual transport block with data of logical channels of the associated logical channel group, and dividing the virtual transport blocks into transport blocks, wherein the sizes of the transport blocks correspond to transport block sizes of their uplink resource assignments.

All computer readable media may be further storing instructions that cause the execution of any of the methods for generating transport blocks discussed herein.

BRIEF DESCRIPTION OF THE FIGURES

In the following the invention is described in more detail in reference to the attached figures and drawings. Similar or corresponding details in the figures are marked with the same reference numerals.

FIGS. 3 & 4 show an exemplary localized allocation and distributed allocation of the uplink bandwidth in a single carrier FDMA scheme.

DETAILED DESCRIPTION OF THE INVENTION

Figure 1:
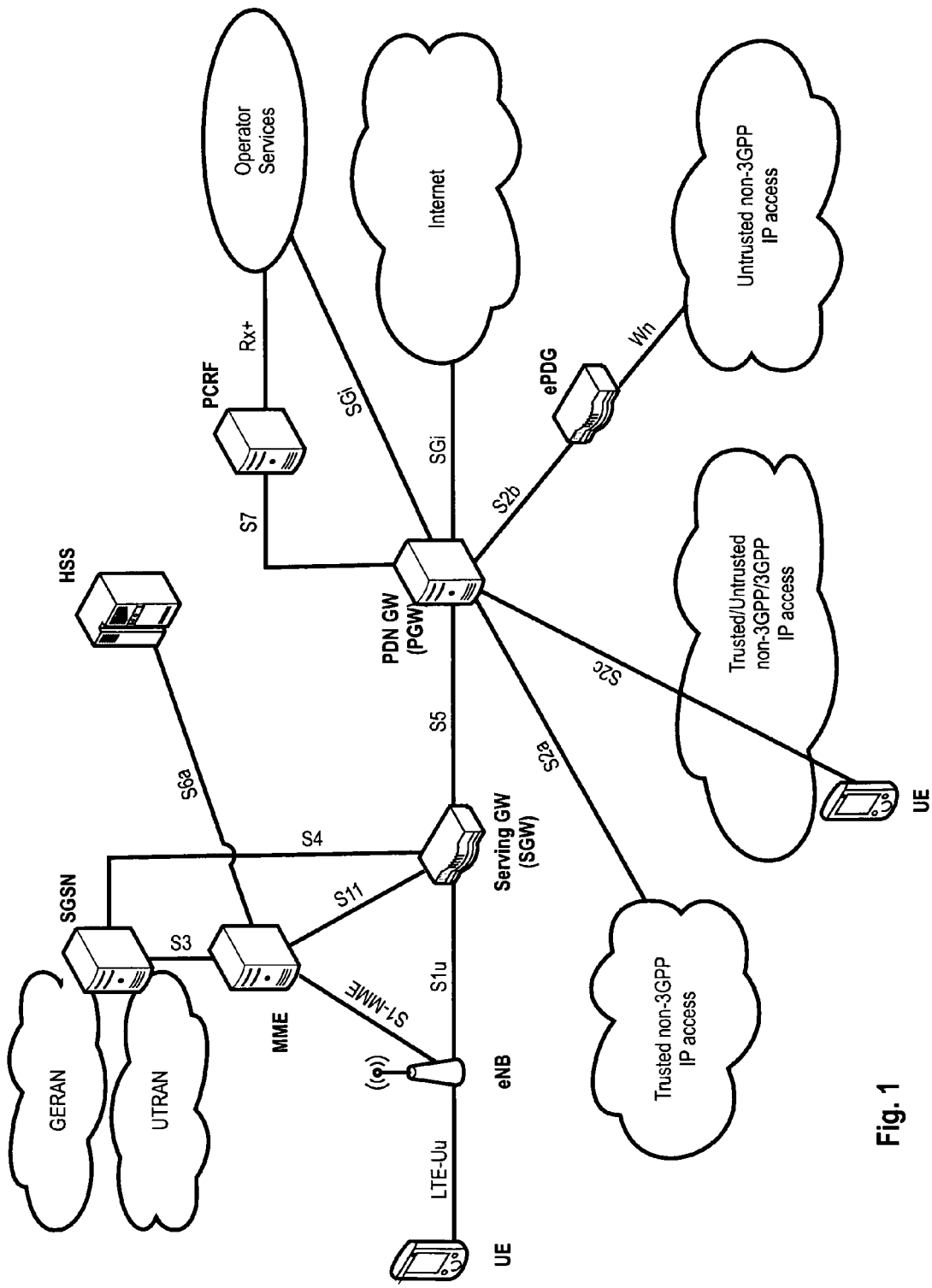
FIG. 1 shows an exemplary architecture of a 3GPP LTE system.
Figure 2:
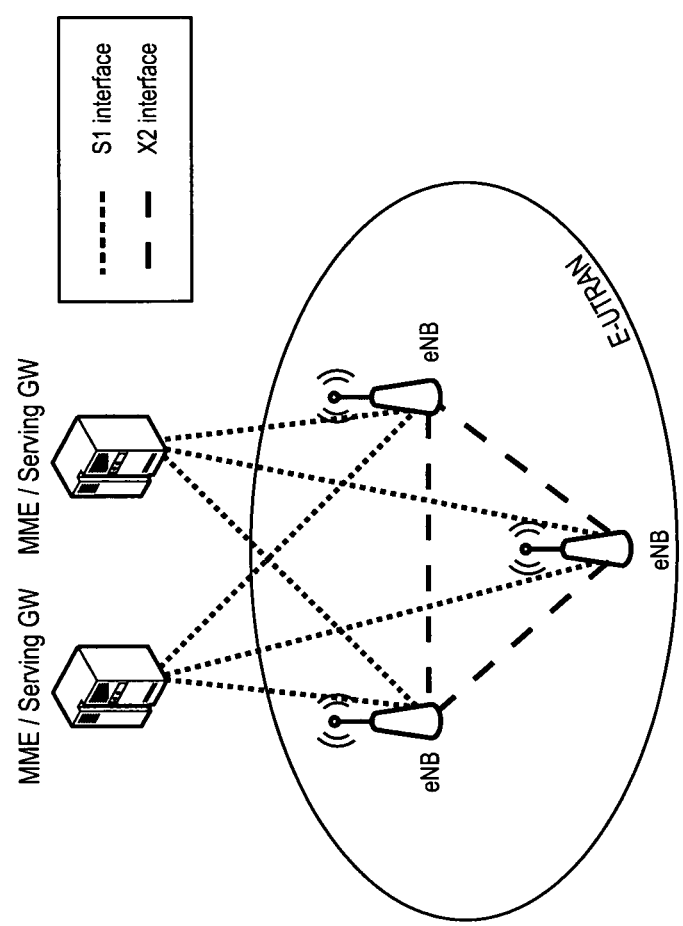
FIG. 2 shows an exemplary overview of the overall E-UTRAN architecture of LTE.

The following paragraphs will describe various embodiments of the invention. For exemplary purposes only, most of the embodiments are outlined in relation to an orthogonal single-carrier uplink radio access scheme according to the LTE-A mobile communication system discussed in the Technical Background section above. It should be noted that the invention may be advantageously used for example in connection with a mobile communication system such as the LTE-A communication system previously described, but the invention is not limited to its use in this particular exemplary communication network.

The explanations given in the Technical Background section above are intended to better understand the mostly LTE-A specific exemplary embodiments described herein and should not be understood as limiting the invention to the described specific implementations of processes and functions in the mobile communication network. Nevertheless, the improvements proposed herein may be readily applied in the architectures/systems described in the Technical Background section and may in some embodiments of the invention also make use of standard and improved procedures of theses architectures/systems.

As mentioned in the Technical Background section above, LTE-A supports bandwidth aggregation where multiple transport blocks can be transmitted in one TTI in the uplink on multiple component carriers. Multiple uplink resource assignments for different component carriers in one TTI may therefore be received at a user equipment that need to be properly processed. Consequently the user equipment needs to generate and transmit in one TTI multiple transport blocks on the different component carriers in the uplink, i.e. there will be only one transport block (TB) (in absence of spatial multiplexing) per component carrier.

An exemplary transport block generation procedure for the case that a mobile terminal (e.g. a user equipment in the 3GPP context) receives multiple uplink resource assignments for a single TTI and basically reuses the state-of-the art logical channel prioritization (LCP) procedure as known from LTE Rel. 8 could look like the following. The user equipment performs a logical channel prioritization procedure for each assigned uplink allocation on the corresponding component carrier. The logical channel prioritization procedures are performed sequentially, i.e. the user equipment generates the first transport block according the first uplink resource assignment and then the second transport block according the second uplink resource assignment and so on. The user equipment chooses autonomously in which order to generate the transport blocks, i.e. user equipment chooses in which order the uplink resource assignments are processed. When choosing the order the user equipment may try to optimize for the amount of data transmitted in a TTI, i.e. depending on the transport block generation order the amount of MAC header in a transport block might differ due to the multiplexing of data from different logical channels in one transport block.

As already indicated above, the eNodeB doesn't know the order in which the user equipment processes the received uplink resource assignments, i.e. in which order user equipment generates the transport blocks. As a consequence, the eNodeB does not know the content of the respective transport blocks generated by the user equipment. Therefore, efficient QoS control of uplink transmissions by the eNodeB is not possible. Another potential drawback is the extremely tight timing between the reception of the uplink resource assignments and the point in time the user equipment needs to have generated the transport blocks according to the uplink resource assignments for transmission on the allocated resources.

Furthermore, another issue related to the generation and transmission of multiple transport blocks in response to the uplink resource assignments is power control for the transmissions of the transport blocks on the assigned uplink component carriers within a TTI. Even though most details of the uplink power control algorithm for the carrier aggregation case are still open or under discussion in the 3GPP working groups, the general agreement is that LTE-A supports component carrier specific uplink power control, i.e. there will be one independent power control loop for each uplink component carrier configured for the user equipment. Furthermore, power headroom reporting per component carrier is envisioned.

While there is a per-component carrier power control envisioned in LTE-A, the maximum transmit power available to the user equipment for uplink transmissions (commonly referred to as $P_{MAX}$ in the power formulae) is defined per-user equipment. Hence, there may be cases where there is a power limitation of the user equipment, i.e. the user equipment's transmit power that would be required for the simultaneous transmission of the transport blocks within a TTI according to the transport format defined in the uplink resource assignments is exceeding the maximum allowed transmit power as configured by the network (e.g. the serving eNodeB) or as provided by the UE capability class. Hence, there is a need for a definition of how the user equipment should utilize the maximum available transmit power for uplink transmissions for transmission of plural transport blocks in case a user equipment is power limited.

The invention aims to provide an efficient and tight QoS control for uplink transmissions by a base station (eNodeB or Node B in the 3GPP context) in a scenario where a mobile terminal (user equipment in the 3GPP context) is assigned multiple uplink resources in one transmission time interval (e.g. one or more sub-frames). The invention also provides an efficient utilization of the transmit power available to the mobile terminal for uplink transmissions in a TTI, even in cases where the mobile terminal is power limited, as described above.

A consideration underlying this invention is to introduce a priority order for the uplink resource assignments (respectively for the transport blocks corresponding thereto). This priority order is considered by the mobile terminal when generating the transport blocks for uplink transmission and/or in the distribution of the transmit power available to the mobile terminal for uplink transmissions in a TTI to the respective transport blocks to be transmitted within the TTI. The priority order is sometimes also referred to as the processing order. This is—as will become more apparent from the following—because the priority order defined for the uplink resource assignments (respectively for the transport blocks corresponding thereto) is implying the order in which the uplink resource assignments (respectively for the transport blocks corresponding thereto) are processed.

One aspect of the invention is the prioritization of the power allocation for individual transport blocks corresponding to plural uplink resource assignments within power control. This aspect is particularly applicable to situations where the mobile terminal is power limited and ensures an efficient distribution of the available transmit power to the different transport blocks. According to this aspect of the invention, the order of processing the uplink resource assignments (priority order) on the uplink component carriers is used to determine power scaling for the power allocation of the individual transport blocks to be transmitted on the respective component carriers in the uplink. According to this aspect of the invention, a per-component carrier, respectively per-transport block or per-resource assignment, power scaling is applied.

In power limited situations, the mobile terminal reduces the transmit power for the transmission of each of the transport blocks according to the priority of the respective transport block given by the priority order, such that the total transmit power spent for the transmissions of the transport blocks becomes smaller or equal to a maximum transmit power available to the mobile terminal for transmitting the transport blocks in the uplink within a given TTI.

According to one exemplary implementation the transmit power scaling is reducing the transmit power and is taking into account the priority of the resource assignment of a respective transport block (or component carrier on which the respective transport block is to be transmitted), as given by the priority order in that transmission of transport blocks having high priority should be least effected by the transmit power reduction. Advantageously, the lower (higher) the priority of the resource assignment/component carrier according to the priority order, the larger (smaller) the power reduction applied to the transmit power for the transport block required by its corresponding uplink resource assignment.

As mentioned before, the power scaling may be ideally configured such that the transmission of high priority transport blocks should be not reduced where possible. Instead the transmit power reduction to meet the a maximum transmit power available to the mobile terminal for transmitting the transport blocks in the uplink within a given TTI should be first tried to be obtained by limiting the transmit power of transmissions of low priority transport blocks.

Moreover, in a more advanced implementation, the power control mechanism in the mobile terminal ensures that the control information to be signaled on a physical uplink control channel, such as the PUCCH in LTE-A, do not undergo power scaling, but only transmissions on the physical uplink shared channel, i.e. transport blocks, transmitted concurrently to the control information, such as the PUCCH in LTE-A, within the same TTI is subject to power scaling. In other words, the power control mechanism is designed to assign the remainder of the difference between the transmit power available to the mobile terminal for uplink transmissions within a TTI and the transmit power required for the signaling of control information on the physical uplink control channel is distributed on a per-transport block basis to the transport blocks on the physical uplink shared channel taking into account the priority order of the transport blocks.

A second aspect of the invention is the introduction of a prioritization of the uplink resource assignments, so that multiple uplink resource assignments can be ranked in the mobile terminal in a priority order which determines the order in which the uplink resource assignments are processed, respectively the order in which the individual transport blocks corresponding to the uplink resource assignments are filled. To put it different, the priority order may define how the data of different logical channels is multiplexed to the transport blocks for transmission in the uplink.

A third aspect of the invention is to optimize the procedures for generating the transport blocks (referred to as logical channel prioritization procedures in this document) for the multiple uplink resource assignments such that also tight timing constraints can be met. Considering for example a LTE Rel. 8 based communication system, the uplink resource assignments are typically received four sub-frames prior to the point in time the corresponding uplink transmission of the transport blocks according the uplink resource assignments take place. Hence, the user equipment typically needs to generate all transport blocks within a time period of 4 ms (considering an LTE Rel. 8 sub-frame duration of 1 ms) starting from the reception of the uplink resource assignments. Sequentially performing several logical channel prioritization procedures for each uplink resource assignment appears challenging by the user equipment within this time period at present.

In accordance with an aspect of the invention, a prioritization of the uplink resource assignments is introduced so that the multiple uplink resource assignments which are received simultaneously can be ranked in the mobile terminal in a priority order. The prioritization of the uplink resource assignments is used to determine the order in which the individual transport blocks corresponding to the uplink resource assignments are filled, respectively how the data of different logical channels is multiplexed to the transport blocks for transmission in the uplink. For example a mobile terminal first generates the transport block corresponding to the highest priority uplink assignment by means of logical channel prioritization procedure, then the next transport block corresponding to the second highest priority uplink assignment and so forth. The multiplexing of the data to the transport blocks in the given priority order of their corresponding uplink resource assignments could be for example realized in that the transport blocks are sequentially filled with data of the logical channels in the priority order of their corresponding uplink resource assignments and logical channel priorities.

The mobile terminal will process the received uplink resource assignments for one transmission time interval according to the priority order, i.e. the mobile terminal will start with the highest priority uplink resource assignment and then continues processing in decreasing priority order. Due to the introduction of a priority order for the uplink resource assignments, the mobile terminal's behavior is deterministic from a eNodeB point of view in terms of logical channel to transport block mapping so that efficient QoS control for uplink transmissions becomes possible. For example, the eNodeB could implement a QoS control in a similar fashion to the QoS control mechanisms in a LTE Rel. 8 system as discussed in the Technical Background section.

Besides pre-configuration, there are different possibilities how the mobile terminal can be made aware of the priority order of the uplink resource assignments. For example, one solution for informing the user equipment on the priority order of the uplink resource assignments to be considered in the generation of the transport blocks may be to indicate for each uplink resource assignment an individual absolute priority. For example, the priority of an uplink resource assignment could be comprised within the uplink resource assignment itself. In one exemplary embodiment of the invention, a LTE-A communication system is assumed. In this exemplary embodiment, a priority for uplink resource assignments is signaled to the user equipment. The user equipment considers the priority order when generating the transport blocks, respectively performing a logical channel prioritization procedure. In more detail, when signaling an uplink scheduling grant (uplink resource assignment) on the PDCCH to the user equipment, the PDCCH may for example contain a priority field, which indicates the priority of the corresponding assignment. Based on the signaled priorities for the uplink scheduling grants, the user equipment is able to generate a priority order of the grants. Assuming that there can be up to five simultaneous uplink resource assignments in one TTI, there priority indicates for example a value between 1 and 5, 1 denoting the highest priority and 5 denoting the lowest priority. Compared to the presently defined LTE Rel. 8 signaling, this exemplary embodiment of the invention requires a new information field to be introduced on a PDCCH which carries an uplink resource assignment, e.g. PDCCH with DCI format 0, so signal the priority of the uplink resource assignment.

In an alternative embodiment of the invention, each uplink resource assignment is allocating radio resources on one of plural component carriers and the component carriers are assigned respective priorities. In this case the priority order of the uplink resource assignments respectively their corresponding transport blocks can be determined by the mobile terminal according to the priorities of the component carriers uplink resource assignments are received for. For example, higher layer signaling, such as MAC control signaling or RRC signaling could be utilized to signal the priority order of the component carriers to the mobile terminal.

According to an embodiment of the invention, one possibility to indicate the priorities/priority order of the uplink resource assignments is that each uplink resource assignment contains a priority field on the PDCCH which indicates the priority of the corresponding uplink grant. The mobile terminal then treats the received uplink resource assignments, i.e. builds the transport blocks, in decreasing priority order starting with the highest priority assignment.

Another variant may be to (once) signal the priority order of the uplink resource assignments respectively Component Carriers (CoCa), which needs to be accounted for within logical channel prioritization procedure rather than signaling the priority of each uplink resource assignment separately on the corresponding PDCCH. This priority order could be only signaled on one PDCCH, which might be also referred to as anchor or serving PDCCH. For example the priority order could indicate CoCa2>CoCa1>CoCa3>CoCa4>CoCa5, which would basically mean that uplink resource assignment received on CoCa2 have the highest priority, assignment received on CoCa1 the second highest priority and so on.

Under the assumption of having at most five component carriers in an LTE-A system, there are 120 different priority orders possible, which would be equivalent to 7 bits. Alternatively there could be a number of pre-configured priority orders and only an index pointing to one of the preconfigured priority order is signaled.

In a further alternative embodiment of the invention, the priority order in which the user equipment is processing the uplink resource assignments is linked to the indices assigned to the configured uplink component carriers. Each component carrier may be assigned an individual carrier index (CI), and the priority order may be defined according to the carrier indices of the component carriers on which the uplink resources are assigned.

When user equipment is configured with a component carrier for data transmission, the eNodeB may assign to each component carrier a carrier index (CI) used for addressing the respective component carrier, e.g. for scheduling data transmission on a component carrier. The mapping of carrier index to component carrier is user-equipment specific. According to one exemplary implementation, when receiving multiple uplink resource assignments for a given TTI, the user equipment processes the uplink resource assignments in increasing carrier indicator order, e.g. starting with uplink grant received for lowest carrier index. In this example, the carrier indices may be assigned by the eNodeB such that the higher/lower the priority of the component carrier the lower/higher the component carrier index. As the eNodeB can define the carrier index mapping for each user equipment individually, i.e. user equipment-specific, the processing order of uplink grants can be controlled on a per-user equipment level.

In an exemplary and more advanced implementation, the eNodeB assigns the uplink Primary Component Carrier (PCC) the lowest carrier index, which is supposed to have the highest reliability since PUCCH carrying uplink control data is transmitted on the uplink PCC, in order to make sure that high priority data like VoIP or RRC signaling is mapped on the uplink PCC.

Alternatively, the eNodeB may assign the carrier indices such that the higher/lower the priority of the component carrier the higher/lower the component carrier index of the component carrier. In this case, the user equipment should processes the uplink resource assignments in decreasing carrier indicator order, i.e. starting with uplink grant received for highest carrier index.

It should be noted, that by assigning a carrier index to configured uplink component carriers, the eNodeB may control the processing order for uplink grants and hence the logical channel to transport block mapping. This allows eNodeB to control the QoS of uplink transmissions.

In a further alternative embodiment of the invention, the priority order of the uplink resource assignments depends on the type of component carrier. As described above there is one primary component carrier (PCC) configured per-user equipment and potentially multiple secondary component carriers (SCC). According to this embodiment user equipment always first processes uplink resource assignment received for the PCC, if any, before any other uplink resource assignments received for a TTI are processed. Regarding the processing/priority order for uplink resource assignments received for SCC(s), there are several options. For example, the processing order for the SCC(s) could be left to user equipment implementation. Alternatively the uplink resource assignments received for the SCC(s) could be treated in the order of the assigned carrier indices, or according to the size of the allocated uplink resources.

In yet another embodiment of the invention, the user equipment processes the uplink resource assignments according to their downlink transmission timing of the downlink component carriers. In this embodiment, the uplink resource assignments are processed in the order of reception, i.e. first received PDCCH (uplink resource assignment) is processed first, then the second received PDCCH is processed next, and so on. The assumption in this embodiment is that the downlink component carriers carrying the uplink resource assignments is not perfectly synchronous, i.e. the sub-frames on the downlink component carriers may have an offset (timing difference) of a few OFDM symbols relative to each other (e.g. 1 or 2 OFDM symbols), i.e. an asynchronous downlink transmission timing is used. Since eNodeB is aware of the timing difference, the eNodeB is consequently also aware of the processing order used by user equipment so that the user equipment's behavior is predictable. Furthermore by having a specified order for the processing of the uplink resource assignments, it can be ensured that high priority data is mapped to the transport blocks whose uplink grants offer the best QoS.

As outlined above, there are numerous possibilities how the priority order can be derived or defined. Signaling the priority order on the PDCCH allows for the highest flexibility, i.e. priority order can be changed on a TTI basis. However, obviously some new PDCCH field needs to be introduced, i.e. new PDCCH format.

Rather than using physical control signaling, in another embodiment of the invention the priority order could be also signaled using higher layer signaling like MAC control signaling or RRC signaling. In case of MAC control signaling a new MAC control element is introduced which indicates the priority order a mobile terminal should treat received uplink resource assignments. In case of RRC signaling some new information element (IE) is introduced which indicates the priority order.

One benefit of using higher signaling compared to physical layer signaling, is that there would be no impact to the PDCCH DCI formats. On the downside a reconfiguration of the priority order requires either MAC or RRC signaling which is not as dynamic as physical layer signaling. In a further embodiment the priority order could be fixed in the standard. This approach would have the least impact to the signaling, however doesn't provide any flexibility, i.e. eNB cannot reconfigure the priority order.

A further embodiment of the invention relates again to the solution of informing the mobile terminal on the priority order of the uplink resource assignment by including thereto a priority field, which indicates the priority the mobile terminal should process the assignment with. Using HARQ on the uplink, it can be assumed that transport blocks are generated only for initial transmissions, so that the priority field on the PDCCH is dispensable for adaptive retransmission grant— i.e. in the uplink resource assignments for retransmissions of a transport block. One possibility is thus to use another PDCCH format for initial transmissions (including the priority field) and retransmissions (not including the priority field), which however again increases the complexity of the mobile terminal. Alternatively the PDCCH indicating uplink resources for an initial transmission and a PDCCH indicating resources for a retransmission could be addressed to a different identity, e.g. RNTI.

Another possibility to avoid waste the bits of the priority field on the PDCCH for adaptive retransmission grants, the bits of the priority field could be used for some other purposes.

In one exemplary embodiment, the bits of the priority field could indicate in a PDCCH scheduling a retransmission uplink timing related information, i.e. Timing Advance command. Another option would be to use the bits for power control related information. Essentially there are several possibilities how to use the priority field for retransmission PDCCHs, i.e. a PDCCH assigning uplink resources for an adaptive retransmission.

In another exemplary embodiment of the invention, there could be some rules or criteria established which are used by the UE in order to determine the priority order of the component carriers, respectively resource assignments. Based on these rules or criteria the mobile terminal is able to decide a priority order without requiring additional signaling from the access network, e.g. the eNodeB. As these rules or criteria are also assumed to be known to the eNodeB, the eNodeB can conclude on the content of the respective transport blocks received from the mobile terminal.

In one exemplary implementation, the mobile terminal orders the received uplink resource assignments based on the amount of allocated resources. For example, the mobile terminal could take into account the allocated transport block size of the resource assignments in decreasing order during LCP procedure, starting with the largest allocated transport block size, respective resource allocation. Accordingly, the transport block corresponding to the resource assignment yielding the largest allocated transport block size would be filled with data of the logical channels first, then the transport block corresponding to the resource assignment yielding the second largest allocated transport block size is filled next, and so on. Alternatively, in another implementation, the mobile terminal orders the uplink resource assignment according to the scheduled modulation and coding scheme (level) or any other parameter signaled in the uplink resource assignments.

Another alternative implementation may be to determine the priority order of the resource assignments based on the scheduling modes of the resource assignments. For example, there could exist different uplink scheduling modes, e.g. dynamic scheduling, semi-persistent scheduling and TTI bundling. Optionally, there may also be contention-based uplink data transmission mode defined as another scheduling mode. The ordering rule could be defined as ordering the uplink grants (resource assignments) based on the uplink transmission mode on the respective component carrier. For example, semi-persistently scheduled uplink transmissions should have higher priority than dynamically scheduled uplink transmission and contention based uplink data transmission.

Furthermore, it should also be noted that of course the different criteria and rules outlined above could be combined arbitrarily with each other to determine a priority order of the resource assignments. For example, the resource assignments could be first ordered according to their transport block size, and if there are resource assignments of the same transport block size, the priority order of these resource assignments may be determined based on a further parameter signaled in the resource assignments, such as the scheduling mode, the modulation and coding scheme level, etc.

Next, exemplary embodiments of the invention will be outlined where a more detailed transport block generation procedure are described. The invention is further proposing different optimized logical channel prioritization procedures that can handle multiple uplink resource assignments for uplink transmissions in a given TTI (or sub-frame). As will be outlined below in more detail, one proposed optimized logical channel prioritization procedure is accumulating the uplink resource assignments to a virtual transport block so that one (joint) logical channel prioritization procedure can be performed for all uplink resource assignments simultaneously. Another approach discussed in further detail below is the parallelization of multiple logical channel prioritization procedures. In this approach also the concept of virtual transport blocks is reused, but still multiple logical channel prioritization procedures for subsets of the uplink resource assignments are performed in parallel.

Figure 5:
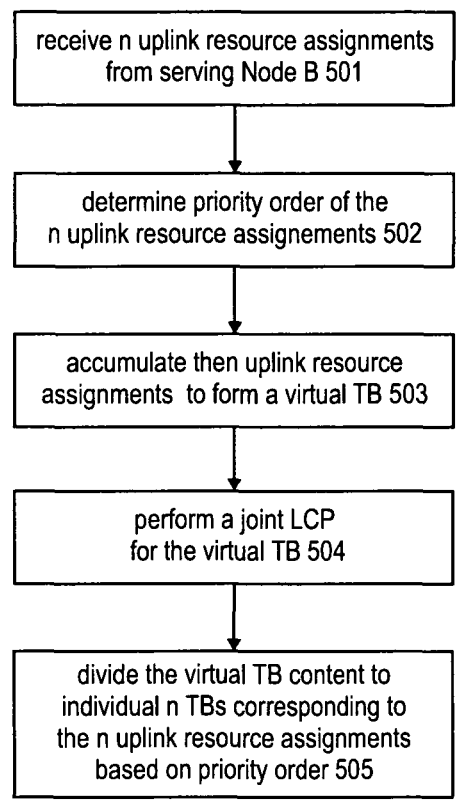
FIG. 5 shows a flow chart of a joint logical channel prioritization procedure for generating multiple transport blocks according to an embodiment of the invention.

One exemplary implementation of a (joint) logical channel prioritization procedure according to an embodiment of the invention is shown in FIG. 5. FIG. 5 shows a flow chart of a transport block generation procedure according to an exemplary embodiment of the invention. The mobile terminal receives 501 multiple uplink resource assignments for one TTI, and determines 502 their priority order.

The mobile terminal accumulates 503 all received uplink resource assignments and forms a single "virtual" big transport block. For an advanced LTE system (LTE-A), it can be assumed that the transport block generation procedure respectively logical channel prioritization procedure is performed in MAC layer. When receiving an uplink resource assignment (PDCCH) at the physical layer, the MAC layer is informed on—amongst other parameters like HARQ protocol related parameters—the transport block size (TBS) of the uplink grant, i.e. number of bits/bytes which are contained in a transport block (TB) respectively MAC PDU. Therefore the accumulation of the uplink resource assignments means that the mobile terminal accumulates the transport block sizes of the corresponding received uplink resource assignments and forms one "big" virtual transport block with an accumulated virtual transport block size as shown in the equation below.

$$vTBS = \sum_{i=1}^{n} TBS_i$$

where n denotes the number of uplink resource assignments in one TTI.

The mobile terminal will then perform 504 only one joint logical channel prioritization procedure for the virtual transport block.

For example, a mobile terminal may be assumed to receive two uplink resource assignments. In this example, the first uplink resource assignment allocates a $TBS_1$ of 500 bytes and a second uplink resource assignment allocates a $TBS_2$ of 700 bytes for a given TTI. The mobile terminal forms a "virtual" transport block with a virtual transport block size of 1200 bytes and runs the logical channel prioritization procedure as having a single uplink resource assignment with a TBS of 1200 bytes. In this example, the same algorithm as in the LTE Rel. 8 logical channel prioritization procedure might be reused. Due to the accumulation of the uplink resource assignments prior to performing the logical channel prioritization procedure, the mobile node needs to consider the boundaries given by the individual transport blocks as defined by their corresponding received uplink resource assignments and the priority order of the assignments when generating the individual assigned transport blocks by dividing the virtual transport block.

A procedure based on a token-bucket model could be used to fill the virtual transport block with data of the logical channels (LCHs) having data pending in the transmission buffer. In one exemplary embodiment of the invention, the mobile terminal maintains a variable Bj for each logical channel j. The variable Bj is initialized to zero when the related logical channel is established, and is incremented by the product PBR×TTI duration for each TTI, where PBR is Prioritized Bit Rate of logical channel j. The value of Bj never exceeds the bucket size and if the value of Bj is larger than the bucket size of logical channel j, it is set equal to the bucket size.

Using this token-bucket model in the logical channel prioritization procedure, the mobile terminal may allocate resources to the logical channels in the following steps:

Step 1: All the logical channels with Bj>0 are allocated resources in a decreasing priority order. If the PBR of a radio bearer is set to "infinity", the user equipment shall allocate resources for all the data that is available for transmission on the radio bearer before meeting the PBR of the lower priority radio bearer(s).

Step 2: The user equipment shall decrement Bj by the total size of MAC SDUs served to logical channel j in Step 1.

Step 3: If any resources remain, all the logical channels are served in a strict decreasing priority order (regardless of the value of Bj) until either the data for that logical channel or the uplink grant is exhausted, whichever comes first. Logical channels configured with equal priority should be served equally.

It should be noted that this procedure is essentially corresponding to the LCP procedure defined in 3GPP TS 36.321, except for the difference of the procedure being performed on the virtual transport block size (vTBS) obtained by accumulating the uplink resource assignments.

Upon having filled the virtual transport block with the logical channel data, the "content" of the virtual transport block is divided 505 into the individual transport blocks corresponding to the respective uplink resource assignments.

Figure 6:
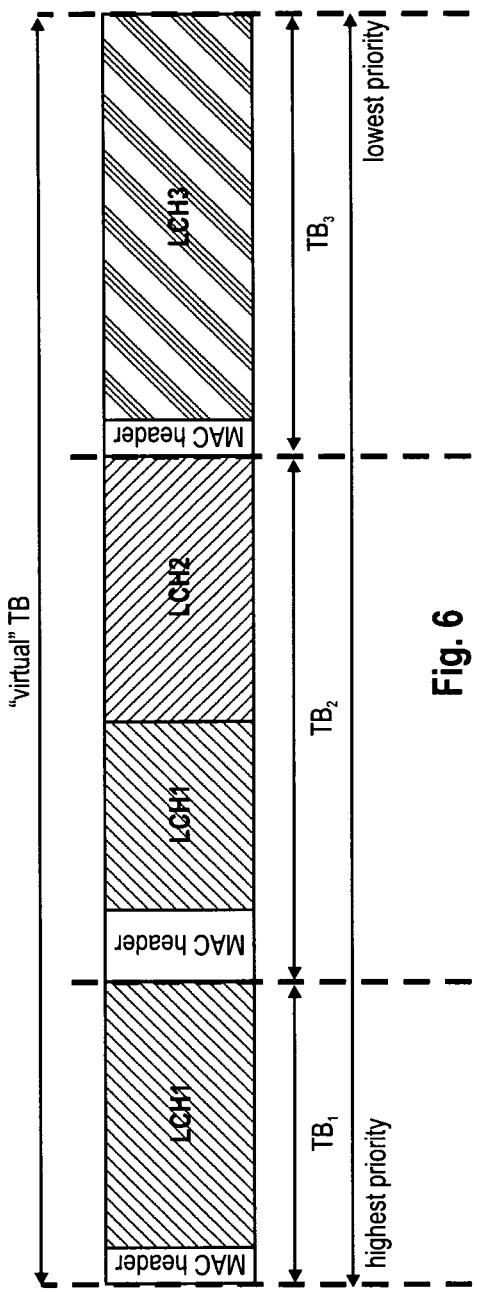
FIG. 6 shows the exemplary content of three transport blocks filled with data of logical channels by the joint logical channel prioritization procedure according to FIG. 5.

In one exemplary embodiment of the invention, the virtual transport block data is divided as follows. It can be assumed that there are n uplink resource assignments $RA_i, i \in [1, \ldots, n]$ yielding respective transport block sizes $TBS_i, i \in [1, \ldots, n]$. The virtual transport block can be represented by a sequence of bits $[B_0, \ldots, B_{vTBS-1}]$. Similarly, the n transport blocks corresponding to the n uplink resource assignments can be represented by sequences of bits $[b_0^i, \ldots, b_{TBS_i-1}^i], i \in [1, \ldots, n]$. The virtual transport block is divided into the n transport blocks, such that $$[b_0^i, \ldots, b_{TBS_i-1}^i] = [B_{\sum_{k=1}^{i} TBS_{k-1}}, \ldots, B_{\sum_{k=1}^{i} TBS_{k-1} + TBS_i - 1}]$$

where $TBS_0=0$ and $i \in [1, \ldots, n]$. Furthermore it can be assumed that the transport blocks are ordered in the given priority order such that the priority of the transport block is decreasing with increasing index i, i.e. the transport block with index i=1 has the highest priority and the transport block with index i=n has the lowest priority. FIG. 6 shows an example for the above outlined joint logical channel prioritization procedure according to an embodiment of the invention.

Generally, as can be perceived from FIG. 6, each transport block (respectively a MAC PDU as the transport block is referred to in the MAC layer) can be assumed for exemplary purposes to consist of a header (MAC header); zero or more MAC Service Data Units (MAC SDU) which contain the data of the logical channels multiplexed into the transport block; zero, or more MAC control elements, and optionally padding bits. The amount of header information within a MAC PDU respectively transport block is typically depending on the number of logical channels of which data is transported in a respective transport block. For each logical channel included in a transport block a so called MAC sub-header is required which indicates for example the identity of the respective logical channel and the length of the MAC SDU (data of o given logical channel). When now performing the joint logical channel prioritization procedure for the "virtual" TB size, the mobile terminal has to consider the MAC header for each of the transport block respectively uplink assignment which is accumulated. For example as can be seen in FIG. 6 each of the three transport blocks requires an individual MAC header. Therefore, the joint logical channel prioritization procedure needs to consider three MAC headers, whereas a logical channel prioritization procedure according to LTE Rel. 8 only needs to consider one MAC header since the logical channel prioritization procedure is only performed for one transport block, since there is no accumulation of uplink resource assignments.

As can be recognized in FIG. 6, by considering the priority order of the uplink resource assignments, it is ensured that the logical channel to transport block mapping is done in accordance to the signaled priority order, i.e. the highest priority logical channel (LCH1 in the example above) is mapped to the highest priority transport block, whereas the data of the lowest priority logical channel is mapped to the lowest priority transport block. Another advantage of this improved joint logical channel prioritization procedure is that the mobile terminal has only to perform one logical channel prioritization procedure instead of plural (here: three) logical channel prioritization procedures, which would need to be performed one after the other. This reduces the complexity of the mobile terminal. As previously noted, for example in LTE Rel. 8 and also in LTE-A there is (will be) a strict timing requirement for the generation of the transport blocks, since it may be expected for LTE-A that an uplink transmission takes place 4 ms after the corresponding uplink resource assignment(s) was/were received, similar to LTE Rel. 8. A LTE Rel. 8-compatible mobile terminal has to generate only one transport block per TTI, however for LTE-A, the mobile terminal may be required to generate multiple transport blocks within the same time period. Therefore it is important to reduce the UE complexity in order to fulfill the timing constraints.

Furthermore the content of the generated transport blocks would also look like different depending on whether UE performs multiple logical channel prioritization procedures sequentially or only one logical channel prioritization for a single "virtual" transport block as according to one embodiment of the present invention.

Figure 7:
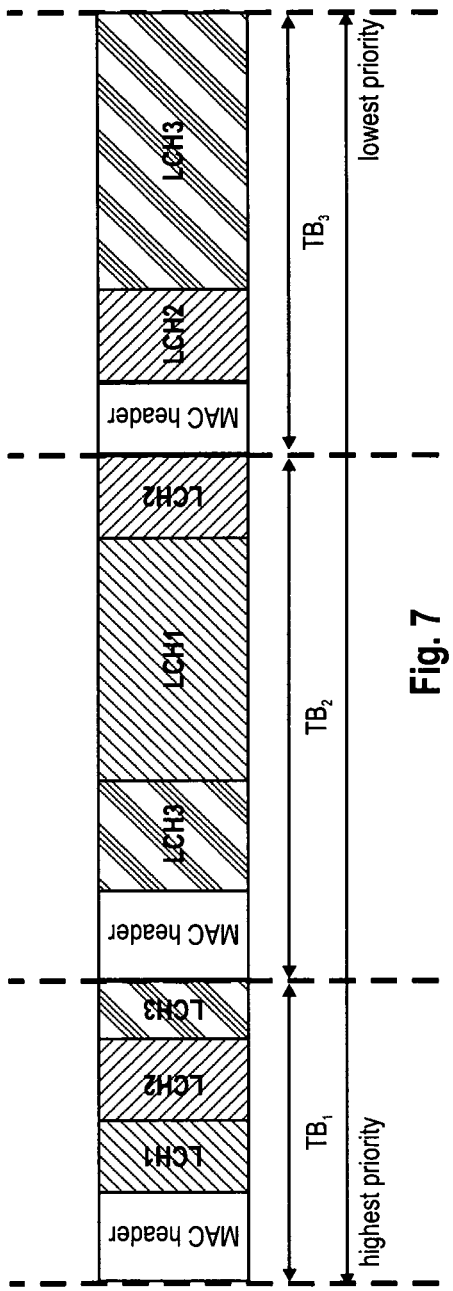
FIG. 7 shows the exemplary content of three transport blocks filled with data of logical channels by the logical channel prioritization procedure performed sequentially on the three transport blocks individually.

FIG. 7 shows exemplary generation of three transport blocks by sequentially performing the known LTE Rel. 8 logical channel prioritization procedures for each transport block. Comparing FIG. 6 and FIG. 7, it can be recognized that performing the three logical channel prioritization procedures sequentially results in a different content of the transport blocks than when performing a single joint logical channel prioritization procedure for a virtual transport block as shown in FIG. 6. This is due the consideration of the Prioritized Bit Rate (PBR) for each logical channel.

In the example FIG. 7, the first transport block (which is assumed the highest priority transport block according to the signaled priority) contains data of all three logical channels LCH1, LCH2 and LCH3, which is equivalent to the PBR value of the first two logical channels and the first part of the PBR value of the third logical channel. It should be noted that for examples shown in FIG. 6 and FIG. 7 logical channel LCH1 has the highest priority, logical channel LCH2 the second highest priority and logical channel LCH3 the lowest logical channel priority. The second transport block contains the remaining part of the PBR value of logical channel three and the remaining data of LCH1, which is the highest priority logical channel and part of the remaining data of the LCH2. The third transport block contains data of logical channels LCH2 and LCH3.

In this scenario where data belonging to three different logical channels is scheduled to be transmitted in one subframe the worst-case scenario from a MAC header overhead point of view would be to multiplex the data of each logical channel on every transport block. This would result in unnecessary MAC header overhead. As mentioned previously a MAC sub-header is required for each included logical channel in a transport block which indicates for example the logical channel ID and the length of the MAC SDU. Essentially the number of logical channels that a multiplexed in a transport block should be reduced in order to reduce the MAC header overhead.

From overhead point of view the transport block generation procedure using a virtual transport block as shown in FIG. 6 provides a reduced overhead compared to the approach where multiple logical channel prioritization procedures are performed sequentially as shown in FIG. 7. Furthermore when only a limited number of logical channels—in an ideal case only one—is multiplexed in a transport block, it is easier and more efficient to consider the QoS requirements of the logical channels when choosing the HARQ operation point which increases in turn the transmission efficiency.

A further embodiment of the invention is related to the handling of MAC Control Elements (MAC CEs) during the transport block generation procedure, e.g. when using the joint logical channel prioritization procedure outlined previously herein. In case carrier aggregation is used on the uplink, the mobile terminal may receive multiple uplink assignments in one TTI and hence needs to generate multiple transport blocks for transmission on the uplink, e.g. the Uplink Shared CHannel (UL-SCH) of an LTE-A system. MAC control elements are used to convey control information in the uplink. They are to be multiplexed with other user data in the uplink data stream. MAC control elements may for example convey scheduling related control information, such as buffer status reports, power headroom reports, etc.

In the context of carrier aggregation, the MAC control elements may be divided onto two types: mobile terminal-specific MAC control elements and component carrier-specific MAC control elements. Exemplarily considering LTE-A-based communication system, the user equipment-specific MAC control elements may be defined as providing control information within the control elements that is related to the (status of) user equipment, rather than being tight to a specific component carrier. One example for a user equipment-specific MAC CE is the buffer status of the user equipment, since uplink data which becomes available in the RLC entity, respectively PDCP entity for transmission on the uplink is not specifically linked to one of the component carriers, i.e. carrier aggregation can be considered transparent to the buffer status reporting procedure. There are also other UE-specific MAC CEs, such as for example the C-RNTI MAC control element, which identifies the UE during Random Access procedure.

Regarding component carrier-specific MAC control elements, their content can be considered tight to a specific component carrier. One example for a component carrier-specific MAC CE in LTE-A is a power headroom report, which informs the scheduler on the power status for a specific component carrier, i.e. difference between maximum UE transmit power and used transmission power for uplink transmission on the specific component carrier. Furthermore, component carrier-specific MAC control elements could also be specific control elements relating to the carrier aggregation. A carrier activation/deactivation request for a specific component carrier may be one example for a component carrier-specific MAC CE.

Returning to the handling of MAC control elements during the transport block generation procedure, according to one embodiment of the invention, the multiplexing of the MAC control elements to the transport blocks during LCP procedure is depending on the type of the respective MAC control elements to be multiplexed to the transport blocks. Considering the example of defining user equipment-specific MAC control elements and component carrier-specific MAC control elements, the mapping (or multiplexing) of the MAC control elements to the transport blocks depends on whether they are user equipment-specific or component carrier-specific.

For example, in one implementation, the (joint) logical channel prioritization procedure ensures that component carrier-specific MAC control element(s) is/are mapped to the transport block transmitted on the component carrier the control element(s) relate(s) to.

Mobile terminal-specific MAC control element(s) whose content is/are not linked to a specific component carrier may be mapped to the transport blocks according to one of several different alternative rules. Please note that in a 3GPP-communication system, the mobile terminal-specific MAC control element(s) can also be referred to as user equipment-specific MAC control element(s).

In one exemplary implementation mobile terminal-specific MAC control elements are mapped to the highest priority component carrier, i.e. according to the priority order of the uplink resource assignments as discussed previously herein. Hence, in this exemplary implementation, the mobile terminal-specific MAC control elements can be considered having a higher priority than data of any logical channels except data from the uplink common control channel (UL-CCCH). This advantageously applies to all terminal-specific MAC control elements except for a padding BSR. It should be noted that even though a padding BSR is considered a mobile terminal-specific MAC CE, in a variation of this implementation it is always mapped to the end of the last generated transport block according to the priority order.

Alternatively mobile terminal-specific MAC control elements may be transmitted on the component carrier where user equipment is camped on. This component carrier is also referred to as the "anchor carrier". Another alternative implementation may be to transmit mobile terminal-specific MAC control elements distributed to all scheduled component carrier(s) according to some predetermined rule, which would however introduce the largest signaling overhead, though providing the highest reliability due to the diversity gain that can be achieved.

In the following a more detailed description of a transport block generation procedure considering the MAC control element mapping according to an embodiment of the invention is outlined with respect to FIG. 12. This embodiment of the invention can be considered an extension of the embodiments relating to the performance of a (joint) logical channel prioritization described above, where the mobile terminal accumulates all received resource assignments and forms a single virtual grant, respectively virtual transport block.

Figure 12:
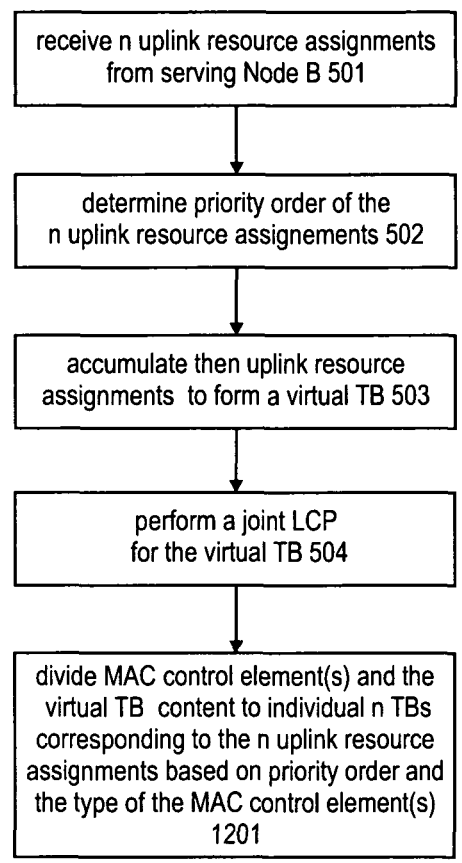
FIG. 12 shows a flow chart of a joint logical channel prioritization procedure for generating multiple transport blocks according to another embodiment of the invention, FIG. 13 exemplifies the content of transport blocks filled with data of three logical channels and two MAC control elements assuming the presence of three resource assignments according one exemplary implementation of the joint logical channel prioritization procedure shown in FIG. 5, FIG. 14 exemplifies the content of transport blocks filled with data of three logical channels and two MAC control elements assuming the presence of three resource assignments under consideration of prioritized bit rates of the logical channels according another exemplary implementation of the joint logical channel prioritization procedure shown in FIG. 5, FIGS. 15 & 16 exemplify the content of transport blocks filled with data of three logical channels and two MAC control elements assuming the presence of three resource assignments according two further exemplary implementations of the joint logical channel prioritization procedure shown in FIG. 5, FIGS. 17 & 18 show the Layer 2 structure with configured carrier aggregation for the downlink and uplink, respectively.

As shown in FIG. 12 and similar to the procedure outlined with respect to FIG. 5 previously herein, the mobile terminal receives 501 multiple uplink resource assignments for one TTI, and determines 502 their priority order. Furthermore, the mobile terminal accumulates 503 all received uplink resource assignments and forms a single "virtual" transport block as described previously herein. Upon having formed the virtual transport block, the mobile terminal will then perform 504 one joint logical channel prioritization procedure for the virtual transport block so as to determine the amount of data of each logical channel having data in the transmission buffer to be transmitted. Subsequently the data of the virtual transport block and MAC control element(s) pending for transmission are filled 1201 into the transport blocks of the different assigned component carriers based on the priority order of the resource assignments, respectively assigned component carriers, and the type of the MAC control element(s) pending for transmission.

Figure 13:
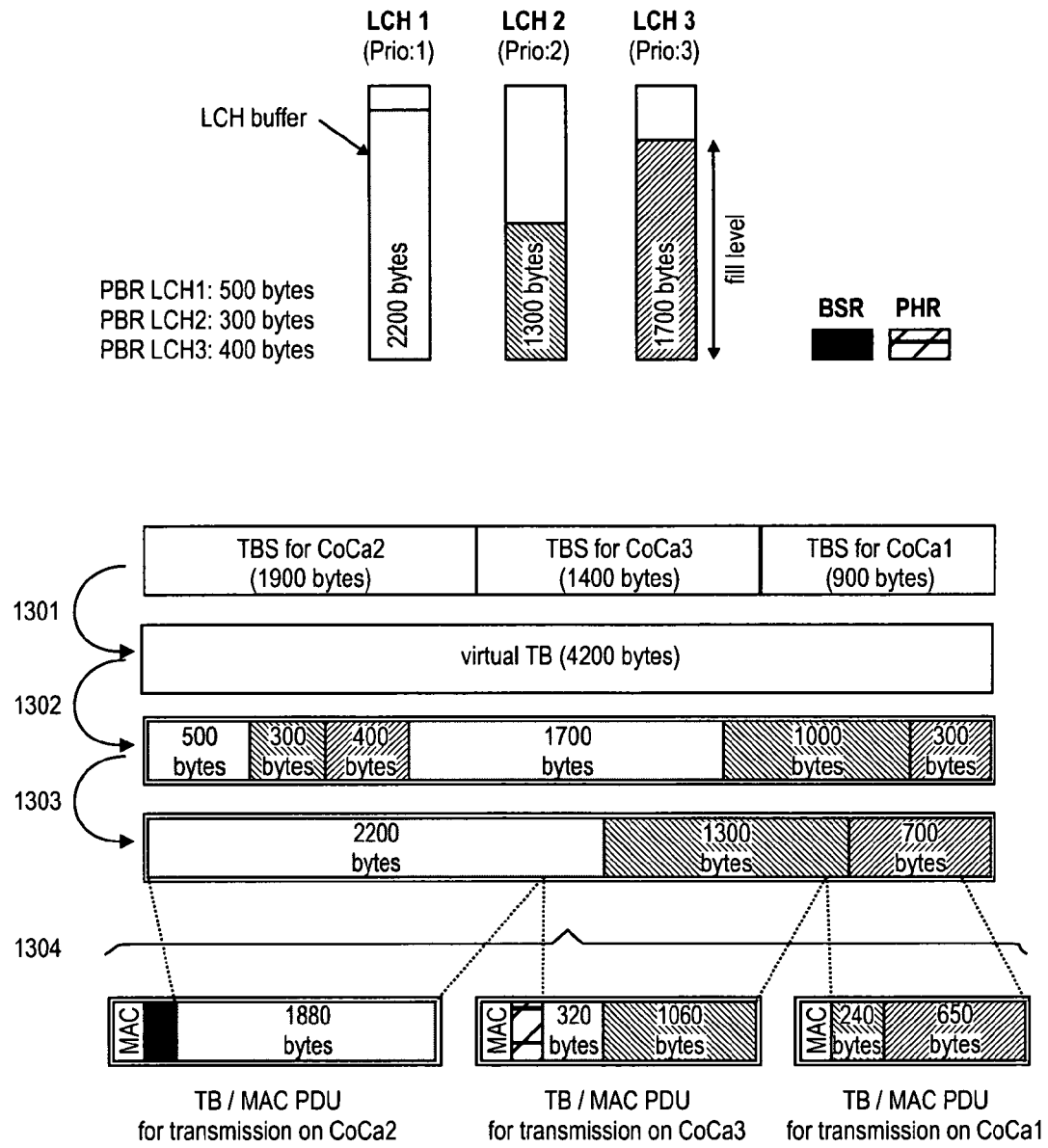

This procedure is exemplified in FIG. 13 for a scenario, where there are three logical channels LCH1, LCH2 and LCH3 configured that have data pending for transmission, and being configured with a Prioritized Bit-Rate (PBR) respectively. Furthermore, it is assumed for exemplary purposes that logical channel LCH1 has the highest priority, logical channel LCH2 has the second highest priority and logical channel LCH3 has lowest priority. Moreover, two MAC control elements are pending for transmission in the transmission time interval, namely one buffer status report (BSR) and a power headroom report (PHR) for component carrier CoCa3. It is assumed that there have been three resource assignments received at the mobile terminal for component carriers CoCa1, CoCa2 and CoCa3, and the priority order of the three component carriers is CoCa2>CoCa3>CoCa1.

The three uplink resource assignments yield a transport block sizes of 900 bytes for the transport block to be transmitted on CoCa1, a transport block sizes of 1900 bytes for the transport block to be transmitted on CoCa2, and a transport block sizes of 1400 bytes for the transport block to be transmitted on CoCa3. The three resource allocations to the mobile terminal are accumulated 1301 to a virtual transport block (virtual TB) having a size of 4200 bytes.

In this exemplary embodiment, as there is a prioritized bit-rate (PBR) for the logical channels, the virtual transport block is first filled with data of the three logical channels according to their logical channel priority up to the prioritized bit-rate of each logical channel. This means that 500 bytes of logical channel LCH1, 300 bytes of logical channel LCH2 and 400 bytes of logical channel LCH3 are added to the virtual transport block first. Subsequently the remaining bytes of the buffers of the three logical channels is added to the remaining bytes (2000 bytes) of the virtual transport block in the logical channel priority order again. The result of these steps is highlighted as step 1302 in FIG. 13.

Please note that for a better overview of how many bytes of each logical channel are mapped to the virtual transport block a step 1303 is shown, which does however not have to be realized when implementing the (joint) logical channel prioritization, for example in form of a computer program. The result of the LCP procedure without consideration of MAC headers and MAC control elements is that 2200 bytes of logical channel LCH1, 1300 bytes of logical channel LCH2 and 700 bytes of logical channel LCH3 are comprised in the virtual transport block.

In the next step, the data of the different logical channels in the virtual transport block and in addition the MAC headers and MAC control elements that need to be transmitted are considered respectively included 1304 in the three transport blocks according to the three uplink resource assignments and taking into account the type of the MAC control elements. Please note that for simplicity of the example, the MAC header size (MAC) and the MAC control elements are assumed to consist each of 10 bytes. The three transport blocks are filled in the priority order of the resource assignments, respectively, the component carriers to which they refer. Furthermore, for mapping the MAC control elements to the (real) transport blocks to be transmitted, the type of the MAC control elements is considered. In this example, mobile terminal-specific control elements are mapped to the highest priority transport block that is the transport block of the resource assignment on CoCa2 in this example. The component carrier-specific control elements are mapped to the transport block to be transmitted on the component carrier to which the respective component carrier-specific control elements refers to.

In this example the component carrier CoCa2 has the highest priority among the scheduled component carriers and the transport block to be transmitted thereon is filled first. One of the MAC control elements that need to be transmitted is a buffer status report (BSR) of the mobile node, i.e. a mobile terminal-specific MAC control element, which is to be multiplexed to the transport block to be transmitted on component carrier CoCa2. Accordingly, the LCP procedure fills the transport block with a MAC header (MAC), the buffer status report (BSR) and the remaining 1880 bytes of the transport block to be transmitted on component carrier CoCa2 with data of the highest priority logical channel, i.e. logical channel LCH1.

Next filling the transport block to be transmitted on component carrier CoCa3, the LCP procedure maps the power headroom report (PHR) for component carrier CoCa3 to this transport block together with the required MAC header (MAC). The remaining bytes of the transport block to be transmitted on component carrier CoCa3 (that is 1380 bytes) is filled with data from the logical channels according to their logical channel priorities. Here, the remaining 320 bytes of the logical channel LCH1 are added to the transport block to be transmitted on component carrier CoCa3 first, and the remaining 1060 bytes are filled with data of logical channel LCH2.

Thereupon the third transport block to be transmitted on component carrier CoCa1 is filled next. As there are no MAC control elements remaining for transmission, the transport block is only filled with the MAC header (MAC) and the remaining bytes of the transport block to be transmitted on component carrier CoCa1 (that is 890 bytes) is filled with data from the logical channels according to their logical channel priorities, i.e. the remaining 240 bytes of logical channel LCH2, and 650 bytes of logical channel LCH3. Please note that due to the addition of MAC headers and MAC control elements, not all data of logical channel LCH3 within the virtual transport block can be added to the third transport block to be transmitted on component carrier CoCa1.

To summarize the exemplary generation of transport blocks exemplified using FIG. 13, the mobile terminal-specific MAC control element(s) is transmitted on the highest priority component carrier, i.e. within the transport block on component carrier CoCa2, whereas the component carrier-specific MAC control element(s) is included in the transport block to be transmitted on component carrier to which it pertains, i.e. component carrier CoCa3.

It should be further noted that within a "real" transport block the relative priorities of MAC CE(s) and logical channels are considered to determine the order of data in the transport block. MAC CE (other than padding BSR) has a higher priority than data from any logical channel, except data from UL-CCCH, and are thus contained first in the transport blocks.

After considering the MAC header and potential MAC control(s) the size of the data of each logical channel to be included in the individual MAC PDUs (transport blocks) are known. The RLC entity is thus requested by the MAC entity to generates RLC PDUs of the respective logical channels (radio bearers) at the respective determined size of data to be included into the MAC PDUs and are delivers to the MAC entity. If padding bits are available in the MAC PDU (transport block) corresponding to the lowest priority component carrier, respectively resource assignment, a padding BSR may be included to this MAC PDU (transport block).

Please note that the implementation of the LCP procedure as described with respect to FIG. 13 is only one example how a LCP procedure using a virtual transport block can be implemented. In particular the mapping of logical channel data into the transport blocks considering the MAC header sizes and potential MAC control elements may be implementation specific.

For example, considering that the number and size of the MAC control elements is known in advance, their size can be considered in the accumulation of the resource assignments to form the virtual transport block. In the example of FIG. 13, knowing that two MAC control elements of 10 bytes each need to transmitted may be considered in subtracting the number of bytes required for the MAC control elements (20 bytes) from the sum of TBS of the resource allocations, so that the virtual TBS is only 4180 bytes instead of 4200 bytes. These 4180 bytes could then be filled with data of the logical channels in a manner described above.

In addition to the number and size of the MAC control elements or alternatively thereto, the LCP procedure could also consider the size of the of the MAC headers in a similar manner. This may however be more difficult to implement in scenarios, where the size of the MAC headers in the respective transport blocks depends on the content of the transport block, which is only know when actually filling the real transport blocks with data of the virtual transport block. However, if the MAC header size can be accurately determined in advance or is fixed, consideration of the size of the MAC headers is straight forward.

Furthermore, in another exemplary variation, if not all data of the virtual transport block can be filled into the transport blocks actually transmitted via the respective assigned component carriers, there may also be different strategies data of which logical channel in the virtual transport block is not included into the real transport blocks. In the example of FIG. 13, some data (50 bytes of the 700 bytes) of the lowest priority logical channel LCH3 within the virtual transport block has been not included to the third transport block to be transmitted on component carrier CoCa1.

In one advanced implementation, the PBR size of the logical channels is further considered in the decision on which data of the virtual transport block is not to be included to the transport blocks. This exemplary implementation ensures that data of at least the prioritized bit-rate size is transmitted for each logical channel in case not all data of the virtual transport block can be added to the real transport blocks (and assuming that the overall resource allocation size is sufficient). For example, if not all data of the virtual transport block can be added to the scheduled transport blocks, data of the lowest priority logical channel is excluded first, but not less then a size equivalent to the PBR of the lowest priority logical channel is included to the real transport blocks. If there still need to be more data to be excluded, data of the second lowest priority logical channel is excluded, but again not less then a size equivalent to the PBR of the second lowest priority logical channel is included to the real transport blocks, and so on until sufficient bytes are excluded so as to match the overall available number of bytes for logical channel data within the transport blocks.

Figure 14:
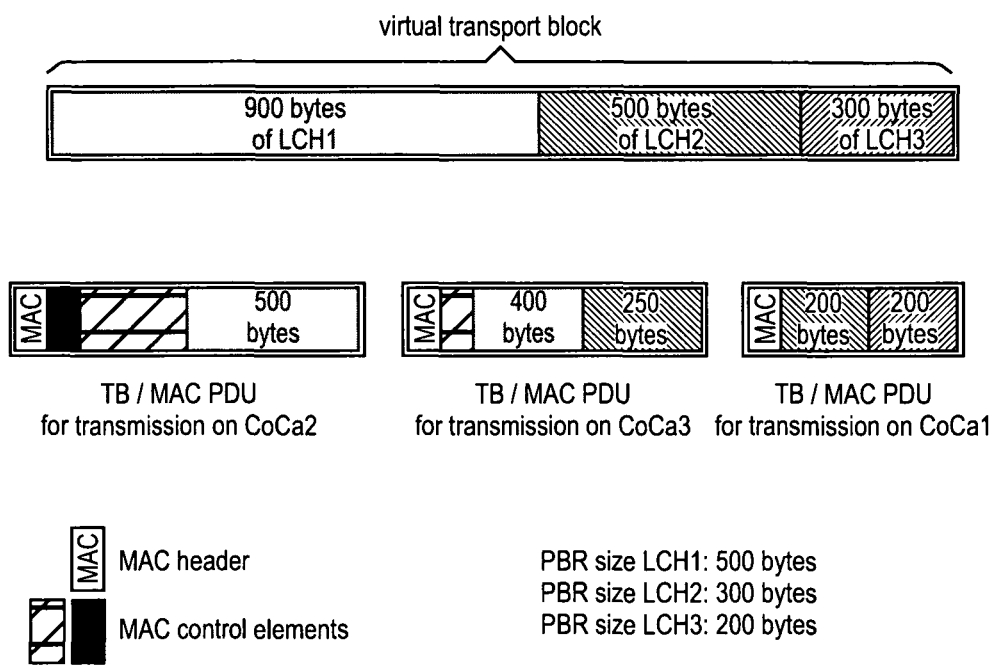
Figure 17:
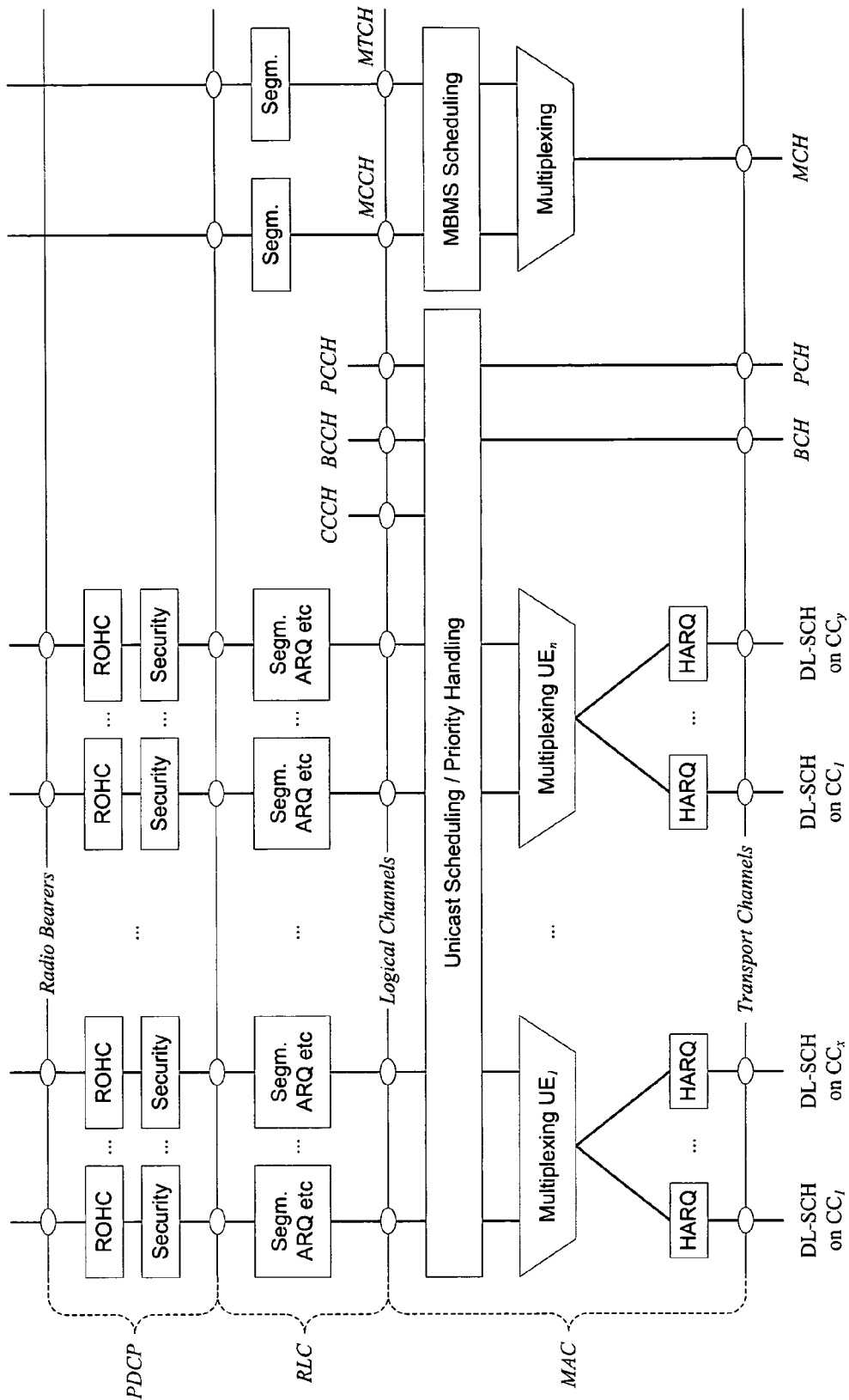
Figure 18:
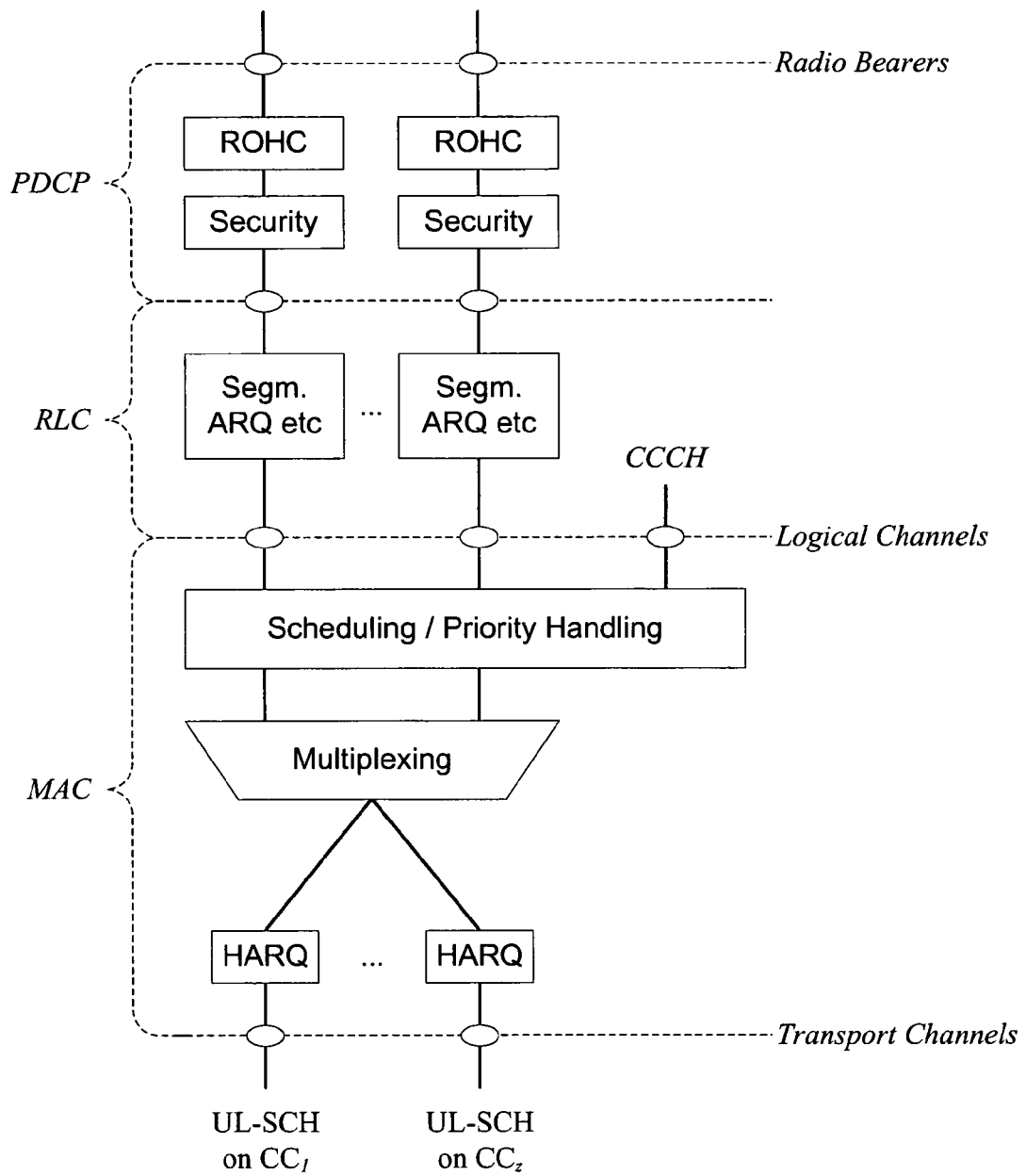

For example, consider the exemplary scenario of FIG. 14 where due to the MAC headers and many MAC control elements, 150 bytes of the virtual transport block can not be included to the transport blocks. Consider further that there is 300 bytes of data of the lowest priority logical channel LCH3 and 500 bytes of data of the second lowest priority logical channel LCH2 included in the virtual transport block. The PBR size for logical channel LCH3 is 200 bytes, while the PBR size of logical channel LCH2 is 300 bytes. According to the procedure above, up to a maximum of 100 bytes of the lowest priority logical channel LCH3—that is 300 bytes (data size of logical channel LCH3 in the virtual transport block size) minus 200 bytes (PBR size of logical channel LCH3)—is excluded from being added to the transport blocks, which means that additional 50 bytes of data of the virtual transport block must be excluded. These excluded additional 50 bytes will be data within the virtual transport block of the second lowest priority logical channel LCH2, as the 50 bytes is smaller than the maximum of 200 bytes of the second lowest priority logical channel LCH2 that can be excluded. Accordingly, the third transport block transmitted on component carrier CoCa1 includes 200 bytes of logical channel LCH2 and 200 bytes of logical channel LCH3. If the PBR size would not have been considered, the third transport block transmitted on component carrier CoCa1 would have included 250 bytes of logical channel LCH2 (so that the full 500 bytes of this logical channel in the virtual transport block would be transmitted) and 150 bytes of logical channel LCH3.

In a further exemplary embodiment of the invention, the mobile terminal-specific MAC control elements and optionally also the component carrier-specific MAC control elements are considered when filling the virtual transport block with data. This is exemplified in FIG. 15 and FIG. 16. Please note that the resulting transport blocks of the different LCP procedures exemplified in FIG. 13 and FIG. 15 are the same. Regarding FIG. 15, the difference to FIG. 13 is that the terminal-specific MAC control elements and the component carrier-specific MAC control elements are already considered 1501, 1502 (as highest priority data) in the filling of the virtual transport block so that—in the example shown in FIG. 15—the buffer status report (BSR) and the power headroom report (PHR) on component carrier CoCa3 is contained in the virtual transport block. Again, less data of logical channel LCH3 is therefore included to the virtual transport block. Assuming that the terminal-specific MAC control elements are to be transmitted within the transport block on the component carrier (associated to the resource assignment) having the highest priority, i.e. the transport block on component carrier CoCa2 in this example, the mapping 1503 of data from the virtual transport block to the real transport blocks needs to ensure that the terminal-specific MAC control elements get mapped to the correct transport block. Similar, the mapping 1503 should further ensure that the respective component carrier-specific MAC control elements are mapped on the respective transport blocks transmitted on the component carrier to which a respective component carrier-specific MAC control element pertains.

In an alternative embodiment of the invention exemplified in FIG. 16, the MAC control elements are again considered when filling 1501 the virtual transport block, similar to the procedure exemplified in FIG. 15. This has the advantage that a priority handling of MAC control elements and logical channels similar to that of LTE Rel. 8 can be applied to the virtual transport block. When distributing 1601 the data of the virtual transport block to the individual transport blocks in accordance with the priority order of their resource assignments, respectively component carriers, the MAC control elements will be transmitted in the transport block scheduled for the highest priority component carrier as the MAC control elements have in general a higher priority than data of any logical channels (except for data from UL-CCCH)—and of course given that they all fit into the first generated transport block scheduled for the highest priority component carrier. Hence, in the majority of cases, the transport block scheduled for the highest priority component carrier contains all MAC control elements (except a "padding BSR" MAC CE if present that would still be included as padding to the end of the last transport block being generated). According to one exemplary embodiment all MAC control elements except a "padding BSR" MAC CE are mapped to the uplink primary component carrier (PCC), i.e. the transport block scheduled on the uplink PCC contains all MAC control elements.

Even though from implementation point of view there might be some benefits to consider MAC control elements already in the virtual transport block generation, this approach may potentially have on the downside some other implications as well. Essentially, since all MAC control elements are mapped to the highest priority transport block, e.g. transport block scheduled on the uplink PCC, the eNodeB is not aware to which component carrier the content of component carrier-specific MAC control elements relate to. Taking the example of FIG. 16, the power headroom report MAC control element that contains the power headroom report for component carrier CoCa3 would be included to the transport block transmitted on component carrier CoCa2. Hence, the eNodeB would no longer know implicitly from the component carrier on which the transport block is received to which component carrier the power headroom information actually relates. Therefore, in a further exemplary embodiment the component-carrier MAC control elements are extended to include a Carrier Indicator field. This Carrier Indicator field indicates which component carrier(s) the content of the MAC control element relates to. For example, assuming that a mobile terminal can aggregate up to five component carriers, the Carrier Indicator field has a size of 3 bits to differentiate the individual component carriers. If carrier combinations should also be indicated more than 3 bits, i.e. 4 bits or—to indicate all possible carrier combinations—5 bits are required for the Carrier Indicator field.

Instead of introducing a new field to the component carrier-specific MAC control elements, alternatively also another already existing field (or combination of (parts of) already defined fields) within the respective MAC control elements could be reused in order to point to the component carrier(s) the content of the MAC control element relates to. For instance, assume that a conventional power headroom report in LTE Rel. 8 consists of 2 reserved bits followed by a power headroom (PH) field of 6 bits that indicate the power headroom, the two reserved bits and the first of the 6 bits could be reused as a Carrier Indicator field, while the remaining 5 bits form the PH field.

This exemplary implementations described above with respect to FIG. 15 and FIG. 16 may both ensure that data of at least the prioritized bit-rate size is transmitted for each logical channel in case not all data of the virtual transport block can be added to the transport blocks (and assuming that the overall resource allocation size is sufficient) as for example described with respect to FIG. 14 before.

Figure 8:
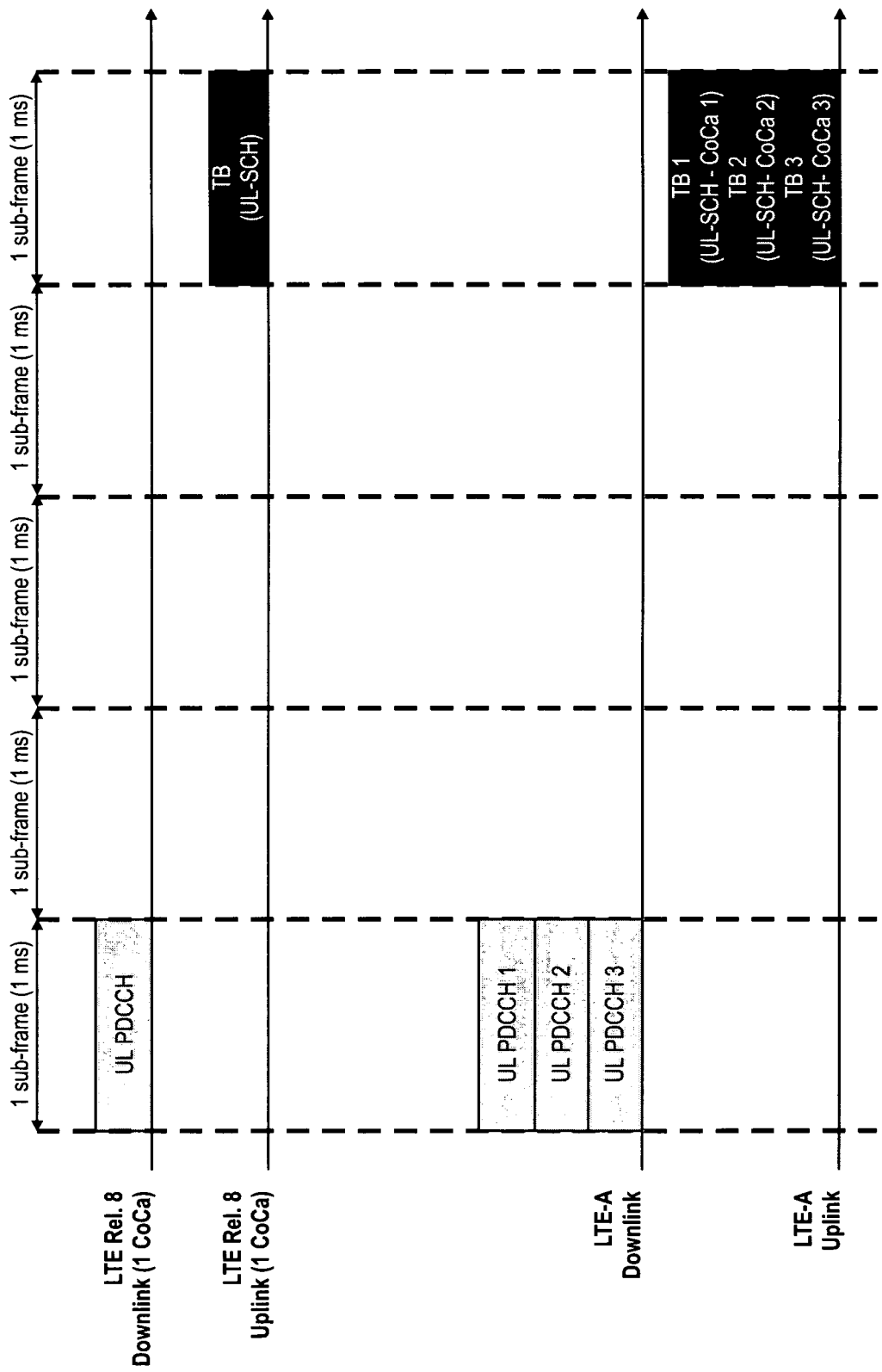
FIG. 8 shows the timing constraints for the generation of a transport block, respectively transport blocks for LTE Rel. 8 respectively LTE-A, FIGS. 9 to 11 exemplify the content of transport blocks filled with data of logical channels by performing parallel logical channel prioritization procedures according to different embodiments of the invention.

Another embodiment of the invention relates to the parallelization of (joint) logical channel prioritization procedures to reduce the complexity of the logical channel prioritization procedures for the case of bandwidth aggregation. Compared to LTE Rel. 8, where there is only one (uplink) transport block in one TTI, the complexity of the transport block generation procedure in LTE-A is increased. Assuming that the same timing requirements as in LTE Rel. 8 are kept in LTE-A, which appears a reasonable assumption due to the backward compatibility requirements, a mobile terminal may need to generate multiple transport blocks within the same time period, i.e. 4 ms, where the mobile terminal had only to generate one transport block for LTE Rel. 8. This is exemplarily highlighted in FIG. 8. The upper part of FIG. 8 relates to LTE Rel. 8, only one component carrier is configured in uplink and downlink direction. The UE receives a single uplink resource assignment (UL PDCCH) on a downlink control channel, and sends a single transport block (TB) on the uplink shared channel (UL-SCH). In LTE-A shown in the lower part of FIG. 8 multiple component carriers are configured in uplink and downlink direction. The UE receives multiple uplink resource assignments (UL PDCCH 1 to UL PDCCH 3) in one TTI (here: the TTI corresponds to one sub-frame) on a downlink control channel, and needs to generate and transmits multiple transport block (TB 1 to TB 3) on the uplink shared channel (UL-SCH).

As outline with respect to FIG. 5, FIG. 6, and FIGS. 12 to 16, the mobile terminal could perform only one logical channel prioritization procedure over for the "virtual" transport block rather than performing several logical channel prioritization procedures sequentially to reduce processing complexity. In another embodiment of the invention a complexity reduction is achieved by dividing one "big" joint logical channel prioritization procedure considering all logical channels (for "virtual" accumulated transport block) into smaller (joint) logical channel prioritization procedures considering only part of logical channels, which are performed in parallel.

The complexity of a logical channel prioritization procedure/transport block generation procedure depends on several parameters, like for example the number transport blocks within one TTI, number of logical channels with available data, the size of the Transport blocks which the mobile terminal needs to generate and also any combination thereof.

This alternative logical channel prioritization procedure for generating transport blocks could be for example implemented as follows. The logical channels having data in its corresponding buffer for uplink transmission are grouped for example according to their logical channel priorities to obtain a number of n logical channel groups. The number of n logical channel groups corresponds to a number of n logical channel prioritization procedures that can be performed by a mobile terminal in parallel. Similar to joint logical channel prioritization procedure considering all logical channels together using an accumulated virtual transport block, also in this embodiment the transport block sizes yielded by the uplink resource assignments are accumulated according to a priority order of their corresponding uplink resource assignments to obtain a number of n virtual transport block sizes of virtual transport blocks. Furthermore, each virtual transport block is associated to a logical channel group.

Next, n logical channel prioritization procedures are performed in parallel by the mobile terminal. A joint logical channel prioritization procedure (as described above) is performed for each virtual transport block to thereby fill the virtual transport block with data of logical channels of the associated logical channel group. The virtual transport blocks obtained by the n logical channel prioritization procedures are then divided into transport blocks, wherein the sizes of the transport blocks correspond to transport block sizes of their uplink resource assignments.

Please note that when accumulating the transport block sizes yielded by the uplink resource assignments to obtain the n virtual transport blocks, a virtual transport block may be formed by accumulating one or more uplink resource assignments. For example, if there are three uplink resource assignments, and there are two virtual transport blocks to be formed, the highest priority uplink resource assignment could define the transport block of the (highest priority/ranked) first virtual transport block, while the remaining two uplink resource assignments are accumulated to form a second (lower priority/ranked) virtual transport block. Similarly, the division of the virtual transport blocks into transport blocks corresponding in size to the respective uplink resource assignments may not be required for each virtual transport block. In the example above, the (highest priority/ranked) first virtual transport block is corresponding in its size to the transport block size yielded by the highest priority uplink resource assignment, so that the virtual transport block and the transport block for this highest priority uplink resource assignment is equivalent. For the (lower priority/ranked) virtual transport block, two uplink resource assignments have been accumulated, so that the virtual transport block is to be divided into two transport blocks with transport block sizes corresponding to the two uplink resource assignments respectively.

In a further embodiment of the invention the mobile terminal is assumed to have a given capability with respect to the transport block generation procedure. This capability (e.g. in form of capability information) is assumed to be known at the eNodeB. For example the mobile terminal signals the capability to network respectively eNode B. In an exemplary scenario, a mobile terminal can only perform a logical channel prioritization procedure for two transport blocks, if more than two logical channels are involved in order to still meet the processing time restrictions. In case there are more than two transport blocks assigned in one TTI and more than two logical channels are active and have data in their buffer, the mobile terminal performs one logical channel prioritization considering the two highest priority logical channels and maps the data onto the first two transport blocks according to the signaled priority order signaled. The second logical channel prioritization procedure which is performed in parallel to the first logical channel prioritization procedure, considers the remaining logical channels with data in their buffer. The data of those logical channels is mapped onto the other Transport blocks according to priority order.

Figure 9:
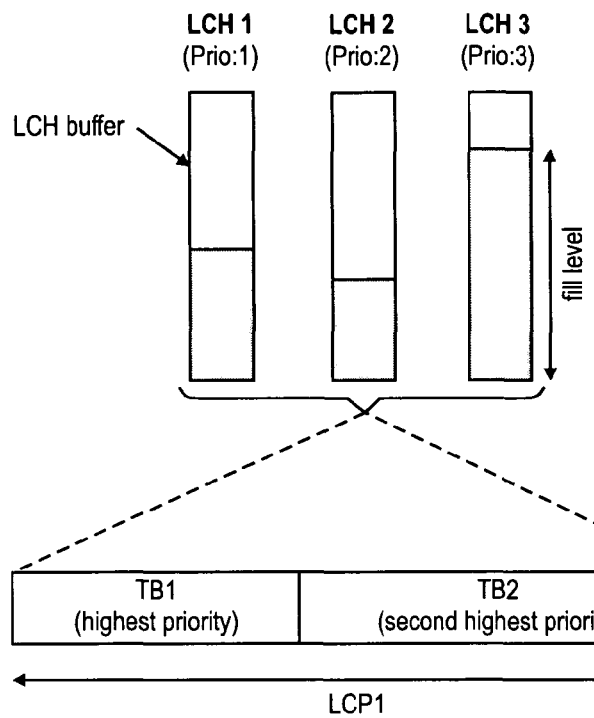

As shown in FIG. 9, in one example, the mobile terminal capability allows the mobile terminal to perform one (joint) logical channel prioritization procedure for two transport blocks when there are multiple logical channels with available data in the corresponding buffer. Hence, in this example, where there are two transport block (respectively two uplink resource assignments for the TTI) and three logical channels (LCH1, LCH2 and LCH3) having data for transmission in their buffer, only one logical channel prioritization procedure considering all (three) logical channels needs to be performed by the mobile terminal. Essentially mobile terminal would accumulate the two received uplink resource assignments to form one accumulated virtual transport block size and performs the logical channel prioritization procedure with this accumulated virtual transport block size as a parameter as described above with respect to FIG. 5 and FIG. 6. Alternatively, also the logical channel prioritization procedure as exemplified with respect to FIG. 12 to FIG. 16 may be employed.

Figure 10:
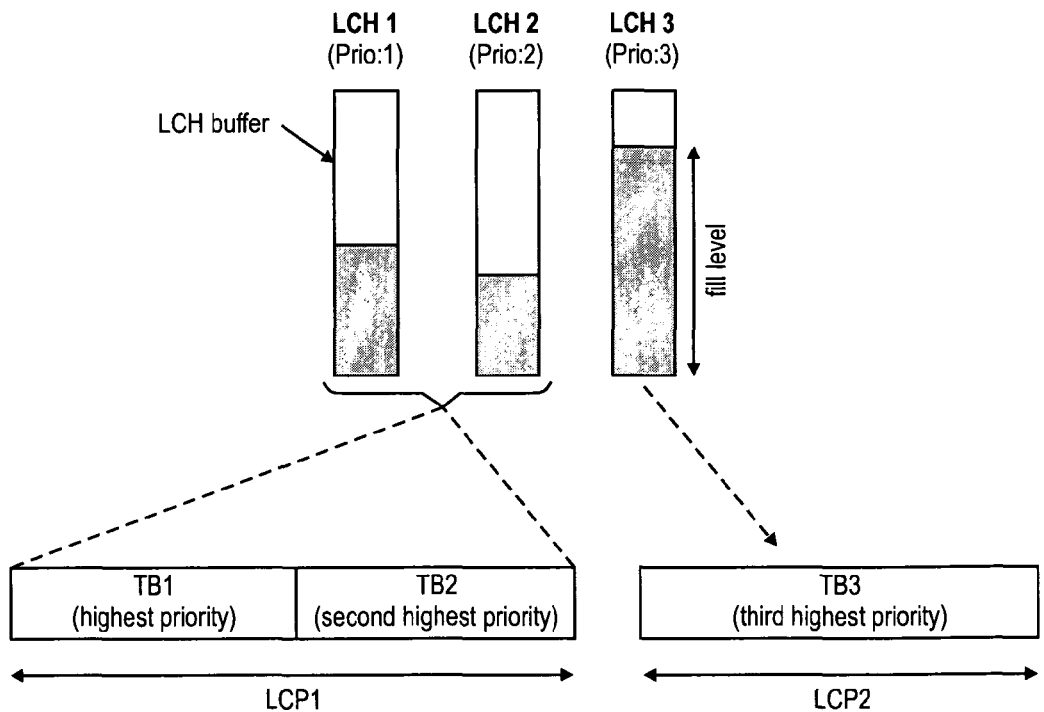

In the scenario shown in FIG. 10, the mobile terminal is assumed to be able to process only a maximum of two logical channels per virtual transport block and can accumulate up to two (i.e. 1 or 2) uplink resource assignment(s) to a virtual transport block. Hence, given that three logical channels (LCH1, LCH2 and LCH3) have data for transmission in their buffer and there are three uplink resource assignments, the mobile terminal needs to perform two logical channel prioritization procedures in parallel in order to generate the three transport blocks, since the mobile terminal capability doesn't allow to perform only one logical channel prioritization procedure over the accumulation of three uplink resource assignment when more than two logical channels are involved.

According to the example shown in FIG. 10, the mobile terminal would accumulate the two highest priority assignments to form a first virtual transport block size and run the joint logical channel prioritization procedure with this accumulated first virtual transport block size considering only the two highest priority logical channels (LCH1 and LCH2) as described above with respect to FIG. 5 and FIG. 6 or FIG. 12 to FIG. 16 to obtain two transport blocks (TB1 and TB2). In parallel the mobile terminal would generate the third transport block TB3 by considering only the data of the remaining logical channel LCH3. For generating the third transport block TB3, the transport block size yielded by the uplink resource assignment for transport block TB3 is equal to the "accumulated" virtual transport block size and the "joint" logical channel prioritization is performed for logical channel LCH3 only.

Figure 11:
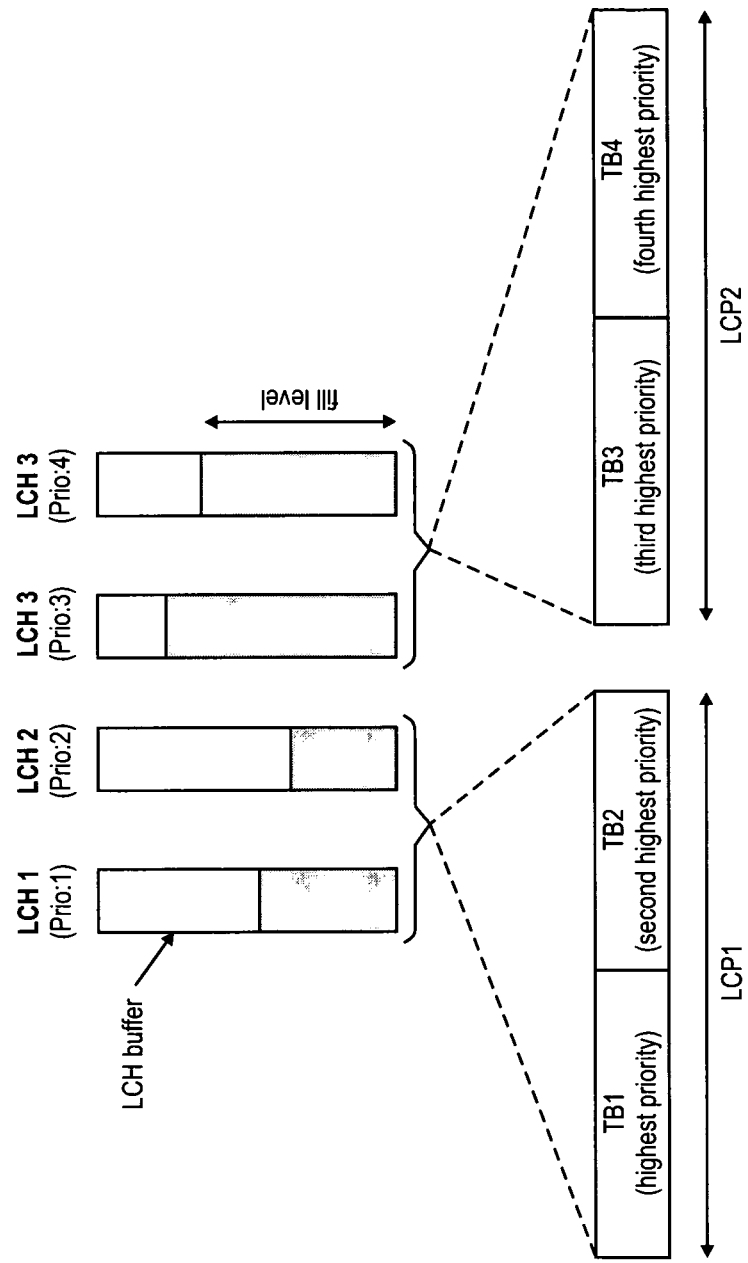

In the scenario shown in FIG. 11, the mobile terminal is again assumed to be able to process only a maximum of two logical channels per virtual transport block and can accumulate up to two (i.e. 1 or 2) uplink resource assignment(s) to a virtual transport block. However, in the scenario shown in FIG. 11, the mobile terminal has four logical channels (LCH1, LCH2, LCH3 and LCH4) of which data is pending for transmission and there are four uplink resource assignments, respectively transport blocks allocated. In this exemplary scenario, the mobile terminal will accumulate the two highest priority uplink resource assignments/transport blocks (TB1 and TB2) and the two lowest priority uplink resource assignments/transport blocks (TB3 and TB4) to a first and second virtual transport block, respectively. Further, the mobile terminal performs a first joint logical channel prioritization procedure on the two highest priority logical channels (LCH1 and LCH2) to fill the first virtual transport block accumulated from transport blocks (TB1 and TB2, and—in parallel—a second joint logical channel prioritization procedure on the two lowest priority logical channels (LCH3 and LCH4) to fill the first virtual transport block accumulated from transport blocks TB3 and TB4.

As already mentioned before the complexity depends on several parameters, therefore also the mobile terminal capability could be defined in a different way. The main point of this parallelization of logical channel prioritization procedures is to reduce the complexity of the transport block generation procedure by performing several lower complex logical channel prioritization procedures in parallel. It should be noted that the UE behavior with respect to logical channel prioritization procedure, e.g. how the logical channels are mapped to the transport blocks, should be known by the eNodeB in order to allow for an efficient QoS control for uplink transmissions. Hence the mapping rules, e.g. how the mobile terminal (UE) groups the logical channels and maps them to the virtual transport blocks, should be exchanged between mobile terminal (UE) and eNodeB.

Another aspect of the invention is the handling of semi-persistent scheduled transmissions in a bandwidth aggregation scenario. As indicated in the Technical Background section above, the eNodeB may decide to schedule individual radio bearers (logical channels) on a semi-persistent basis. Due to the fact that there can be only one transport block per TTI in the uplink in LTE Rel. 8, there can be only either a semi-persistently scheduled transmission or a dynamically scheduled transmission.

However for LTE-A due to the support of bandwidth aggregation, there could be in one TTI semi-persistent scheduled transmission(s) simultaneously to dynamic transmissions. In case the priority order in which the mobile terminal should treat received uplink resource assignments is signaled by higher layer signaling, e.g. MAC control signaling, it basically means, that a SPS uplink resource assignment is processed by the mobile terminal according to the priority of the corresponding component carrier as indicated by the priority order. As an SPS resource allocation on uplink may be assumed to be active for a long time duration, there is a risk that SPS allocations are treated with a low priority, for example if the priority of the component carrier was set to low priority value since uplink interference situation changed. On the other hand data which is transmitted on the semi-persistently allocated resources is usually delay-critical hence high priority data like VoIP or gaming. Therefore in a further embodiment of the invention, SPS resource assignments are always treated as highest priority regardless of the priority of the corresponding component carrier according to the priority order. The same rule may also be used for a dynamic uplink resource allocation which overrides a SPS resource allocation.

As already indicated above, another aspect of the invention is the distribution of the transmit power to the transmissions of the generated transport blocks on the assigned resources on the uplink component carriers. In this context situations where the mobile terminal is power limited are of particular interest. When implementing the invention in a communication system using carrier aggregation in the uplink, like LTE-A, and assuming a per-component carrier power control, another embodiment of the invention is proposing the prioritization of the transmit power allocation on the physical uplink shared channel for the uplink component carriers for cases where the mobile terminal is in a power limited situation. This proposed prioritization of the transmit power available to the mobile terminal is capable of addressing the different QoS of the data/uplink component carriers.

Power limitation denotes the situation where the total transmit power of the mobile terminal that would be required for transmitting the transport blocks on uplink component carriers within a single TTI according to the uplink resource assignments is exceeding the maximum transmit power available to the mobile terminal for uplink transmissions $P_{MAX}$. The maximum transmit power available to the mobile terminal for uplink transmissions $P_{MAX}$ thereby depends on the maximum power capabilities of the mobile terminal and the maximum transmit power allowed by the network (i.e. configured by the eNodeB).

Figure 19:
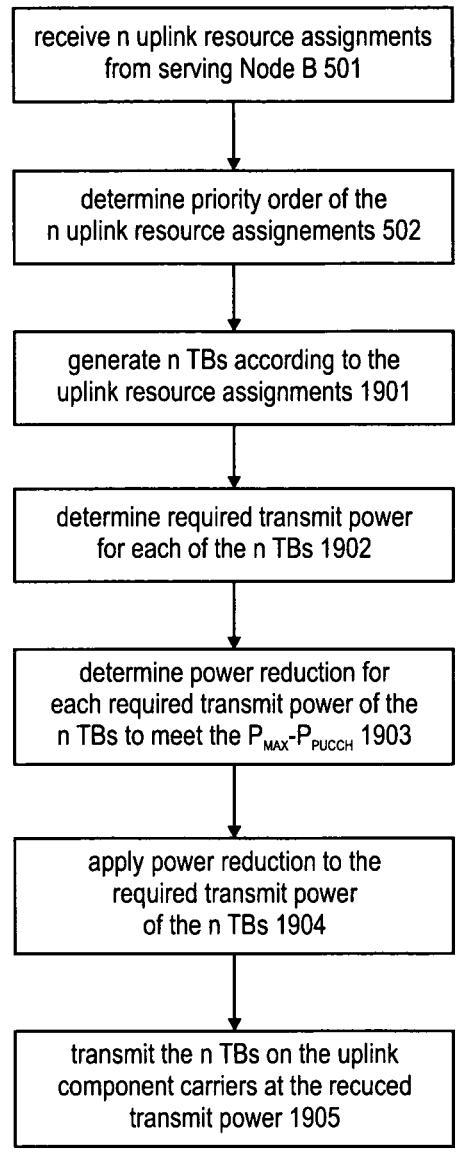
FIG. 19 shows a flow chart of distributing a maximum available transmit power $P_{MAX}$ to the transport blocks to be transmitted within a TTI according to an exemplary embodiment of the invention.

FIG. 19 shows a flow chart of distributing a maximum available transmit power $P_{MAX}$ to the transport blocks to be transmitted within a TTI according to an exemplary embodiment of the invention. In this exemplary embodiment and the following examples below a LTE-A based communication system using carrier aggregation in the uplink, and assuming a per-component carrier power control will be assumed. Furthermore, it is also assumed that the transmission power of the PUCCH (i.e. the control information) is prioritized over PUSCH transmissions (i.e. the transport blocks generated according to the uplink resource assignments), i.e. PUSCH transmit power is first scaled down in a power limited situation.

Similar to the procedures described with respect to FIG. 5 and FIG. 12 above, the mobile terminal first receives 501 multiple uplink resource assignments for one TTI using its receiver unit, and a processing unit of the mobile terminal determines 502 their priority order. The priority order of the uplink resource assignments may be determined according to one of the various exemplary options discussed herein.

Furthermore, the mobile terminal's transport block generation unit generates 1901 the transport blocks according to the uplink resource assignments. This transport block generation may be again implemented according to one of the various exemplary options outlined herein. Furthermore, in another alternative implementation, the transport block for each component carrier may be generated according to the corresponding uplink resource assignment by performing the known LTE Rel. 8 logical channel prioritization for each uplink resource assignment, respectively uplink component carrier.

The mobile terminal's processing unit further determines 1902 for each of the generated transport blocks the transmit power that would be required/implied by their respective uplink resource assignments according to the power control, i.e. required transmission power is given by power control formula. For example, the mobile terminal may use formula (1) as provided in the Technical Background section to determine the transmit power that would be implied for the transmission of each of the transport blocks on the uplink component carriers by the corresponding uplink resource assignment. In this example, the mobile terminal is considered power limited for the transmissions of the transport blocks within the given TTI. The mobile terminal may for example determine its power limitation by comparing the sum of the required transmit powers for the transport blocks to the maximum transmit power available to the mobile terminal for uplink transmissions $P_{MAX}$ minus the transmit power required for control signaling on the PUCCH $P_{PUCCH}$ in the same TTI, and determining thereby that the sum of the required transmit powers for the transport blocks exceeds the maximum transmit power available to the mobile terminal for uplink transmissions $P_{MAX}$ minus the transmit power required for control signaling on the PUCCH $P_{PUCCH}$ in the same TTI.

In order not to exceed the maximum transmit power available to the mobile terminal for uplink transmissions $P_{MAX}$ minus the transmit power required for control signaling on the PUCCH $P_{PUCCH}$ in the same TTI, the mobile terminal needs to reduce the uplink transmit power for the transmission of all or some of the transport blocks. There are several options how this power reduction, also referred to as power scaling, can be implemented done. In the exemplary flow chart shown in FIG. 19, the mobile terminal determines 1903 next a power reduction for each transmission of a respective transport block such that the sum of the reduced transmit power for each transmission of the transport blocks (i.e. the transmit power obtained for each respective transmission of a transport block when applying 1904 the determined respective power reduction to the respective required transmit power as determined in step 1902) becomes equal to or smaller than the maximum transmit power available to the mobile terminal for uplink transmissions $P_{MAX}$ minus the transmit power required for control signaling on the PUCCH $P_{PUCCH}$ in the same TTI. The transmit power control unit of the mobile terminal applies 1904 the determined respective power reduction to the respective required transmit power as determined in step 1902 and transmits 1905 the transport blocks on the assigned uplink resources on the component carriers within the given TTI using the reduced transmit power.

The power reduction or power scaling may be implemented as part of the transmit power control functionality provided by the mobile terminal. The power control functionality may be considered as a function of the physical layer of the mobile terminal. It may be assumed that the physical layer has no idea about logical channel to transport block mapping, respectively the logical channel to component carrier mapping, since the MAC layer of the mobile terminal performs the multiplexing of the logical channel data for multiple component carriers. However, power scaling of the transmissions of the transport blocks (i.e. of the PUSCH) based on uplink component carrier priority (respectively the priority of the uplink resource assignments assigning resources thereon) is desirable to be able to adequately support delay sensitive traffic in a carrier aggregation setting.

More in particular, it is desirable that high QoS data within the transport blocks transmitted on the PUSCH is scaled less compared to low QoS data which can tolerate more retransmissions. Therefore according to one exemplary embodiment of the invention, the power scaling of the transmissions of the transport blocks on the PUSCH (see steps 1903, and 1904) advantageously considers the processing order of the uplink resource assignments, which may be considered equivalent to the priority order of the component carriers on which they assign resources. Since both the processing order of uplink resource assignments as well as the power scaling has an impact on the transmission quality experienced by logical channels, it is desirable to have some interaction between the prioritization of the uplink resource assignments in the transport block generation in the MAC layer of the mobile terminal (see for example step 1901) and the power scaling functionality in the physical layer of the mobile terminal (see steps 1903 and 1904).

This interaction may be for example obtained by the power scaling function provided in the physical layer using the same priority order of the uplink resource assignments for power scaling of PUSCH transmissions as used in the MAC layer for determining the processing order of the uplink resource assignments in the generation of the transport blocks. In one exemplary implementation, the mobile terminal scales down the required transmit powers (see step 1902) for the transport blocks on the PUSCH in the reverse processing order of the uplink resource assignments. Basically the mobile terminal's power control unit starts scaling down the required transmit power for the transmission of the transport block corresponding to the lowest priority uplink resource assignment first, next the terminal's power control unit scales down the required transmit power for the transmission of the transport block corresponding to the second lowest priority uplink resource assignment, etc. If necessary the transmit power of one or more transport blocks may be scaled down to zero, i.e. the mobile terminal performs DTX on the given component carrier(s).

In one further exemplary implementation, the required transmit power for a transmission of the transport block is scaled down to zero, before power scaling the next transport block. Hence, power control unit starts scaling down the required transmit power for the transmission of the transport block corresponding to the lowest priority uplink resource assignment down to zero (if necessary), and if the transmit power needs to be further reduced, the terminal's power control unit scales down the required transmit power for the transmission of the transport block corresponding to the second lowest priority uplink resource assignment again down to zero (if necessary), etc.

The power reduction/scaling of the transmit power may be for example implemented as follows in a LTE-A system. In one exemplary implementation, the eNodeB signals a weight factor $w_c$ for each component carrier c to user equipment that is applied to the PUSCH transmission of a transport block on the respective component carrier. When the user equipment is power limited, its power control unit scales the weighted sum of the transmit power for all PUSCH transmissions on the component carriers on which resources have been assigned. This may be realized by calculating a scaling factor s such that the maximum transmit power available to the mobile terminal for uplink transmissions $P_{MAX}$ is not exceed. The scaling factors can be determined from Formula (2):

$$P_{PUCCH}(i) + s \cdot \sum_c w_c \cdot P_{PUSCH_c}(i) \leq P_{MAX} \quad (2)$$

where s denotes the scaling factor and $w_c$ the weight factor for component carrier c. $P_{PUCCH(i)}$ denotes the transmit power required for the control signaling on the PUCCH within TTI i, and $P_{PUSCH_c}(i)$ denotes the transmit power of a transport block to be transmitted on the PUSCH of component carrier c within TTI i (see step 1902 and formula (1)). Apparently, scaling factors can be determined as:

$$s \leq \frac{P_{MAX} - P_{PUCCH}(i)}{\sum_c w_c \cdot P_{PUSCH_c}(i)} \quad (3)$$

The weight factor $w_c$ of the component carriers may for example consider the QoS of the data transmitted on a specific component carrier.

In one more advanced implementation, it may be assured that the transport block transmitted on the PUSCH of the uplink PCC is not scaled. This may be for example realized by the eNodeB defining the weight factor $w_c$ for the uplink PCC to 1/s. Alternatively, the following relation may be used to determine the scaling factor s only for component carriers other than the uplink PCC:

$$P_{PUCCH}(i) + P_{PUSCH\_PCC}(i) + s \cdot \sum_c w_c \cdot P_{PUSCH\_SCC_c}(i) \leq P_{MAX} \quad (4)$$

so that:

$$s \leq \frac{P_{MAX} - P_{PUCCH}(i) - P_{PUSCH\_PCC}(i)}{\sum_c w_c \cdot P_{PUSCH\_SCC_c}(i)} \quad (5)$$

where $P_{PUSCH\_PCC}(i)$ is the transmit power required for the transmission of the transport block to be transmitted on the uplink PCC (see step 1902 and formula (1)), while $P_{PUSCH\_SCC_c}(i)$ is the transmit power required for the transmission of the transport block to be transmitted on other the uplink SCCs (see step 1902 and formula (1)).

In one further exemplary embodiment of the invention, when generating the transport blocks, the user equipment may process the uplink resource assignments in decreasing order of the weight factors $w_c$. Hence, the priority order may be given by the weighting factors $w_c$. The mobile terminal may start processing with the uplink resource assignment for an uplink component carrier which is assigned the highest weight factor $w_c$. Essentially, the highest weight factor $w_c$ corresponds to highest priority uplink component carrier respectively uplink resource assignment in this embodiment.

In case the same weight factor $w_c$ is applied to multiple uplink component carriers, the processing order may be left to user equipment implementation. Alternatively in case of same weight factor $w_c$, the processing order may also be determined based on the downlink transmission timing of the uplink resource assignments (as discussed above) or based on the carrier index (CI) of corresponding component carriers.

In another exemplary embodiment of the invention, the power scaling by the power control unit of the mobile terminal depends on type of a component carrier on which the respective transport block is to be transmitted. The power assignment to the PUSCH transmission of a transport block on the uplink PCC which carries high priority traffic is prioritized over other PUSCH transmissions on the uplink SCC(s). Power allocation, respectively, the amount of power reduction/scaling on other uplink component carriers, i.e. uplink SCC(s), may be left to user equipment implementation. For example, regarding the remaining uplink SCC(s), the user equipment could multiplexes QoS sensitive data on a component carrier of its choice and is allowed to prioritize power allocation of this component carrier relative to other uplink SCC(s).

In a communication system using carrier aggregation, the mobile terminals may also be allowed to perform random access on a component carrier, while transmitting scheduled data (transport blocks) on other component carriers. For a 3GPP based system like LTE-A, it may thus be possible to that the user equipment is performing a random access channel (RACH) access on one component carrier, while transmitting PUSCH/PUCCH simultaneously on other component carriers. The user equipment may thus transmit a RACH preamble, i.e. a transmission on the physical random access channel (PRACH), and in the same TTI also transmit data on the PUSCH and/or PUCCH. A potential use case for concurrent PRACH and PUCCH/PUSCH transmission is the situation where user equipment is out-of sync on one uplink component carrier, whereas it's still uplink synchronized on other uplink component carrier. In order to regain uplink synchronization for the "out-of-sync component carrier" the user equipment would make a RACH access, e.g. ordered by PDCCH. Furthermore, also in cases where no dedicated scheduling request channel is configured for a user equipment on the PUCCH, the user equipment may perform a RACH access in order to request uplink resources, in case new data is arrived in the UE buffer.

In these cases, according to another embodiment of the invention, the transmit power for the RACH access (i.e. the transmission of the RACH preamble on the PRACH) is not subject power control by the access network. Nevertheless, in this embodiment the transmit power for the PRACH transmission is considered when power scaling is applied by the mobile terminal in power limited situations. Hence, in case of a concurrent PRACH transmission and PUCCH/PUSCH transmission, the transmit powers for PRACH, PUSCH and PUCCH within a TTI should fulfill the relation:

$$P_{PUCCH}(i) + \sum_c P_{PUSCH_c}(i) + P_{PRACH}(i) \leq P_{MAX} \quad (6)$$

where $P_{PRACH}(i)$ is the transmit power for the transmission on the PRACH in TTI i, while in case of power scaling being necessary due to power limitation, the following relation may be in one exemplary scenario to be met:

$$P_{PUCCH}(i) + s \cdot \sum_c w_c \cdot P_{PUSCH_c}(i) + P_{PRACH}(i) \le P_{MAX} \qquad (7)$$

In a more detailed exemplary implementation, the initial preamble transmission power setting (i.e. the setting of $P_{PRACH}(i)$) may be based on an user equipment's open-loop estimation with full compensation of the path loss. This may ensure that the received power of the RACH preambles is independent of the path-loss. The eNodeB may also configure an additional power offset for the PRACH, depending for example on the desired received SINR, the measured uplink interference and noise level in the time-frequency slots allocated to RACH preambles, and possibly on the preamble format. Furthermore, the eNodeB may optionally configure preamble power ramping so that the transmit power $P_{PRACH}(i)$ for each retransmitted preamble, i.e. in case the PRACH transmission attempt was not successfully, is increased by a fixed step.

There are different alternatives for the power scaling for the case of concurrent PRACH and PUCCH/PUSCH transmission. One option is that the PRACH transmission power $P_{PRACH}(i)$ is prioritized over the PUSCH transmission power $$\sum_c P_{PUSCH_c}(i),$$

similar to the PUCCH transmit power $P_{PUCCH}(i)$. This option is shown in relation (7) above.

Alternatively, another option is to prioritize the PUCCH/PUSCH transmissions over PRACH transmissions. In this case the user equipment would first scale down the transmit power $P_{PRACH}(i)$ of the PRACH and then subsequently scale down the transmit power $$\sum_c P_{PUSCH_c}(i)$$

of the PUSCH (if necessary).

In a third option, no concurrent transmission of PRACH and PUCCH/PUSCH is allowed. Hence, in this case the user equipment drops either the PUCCH/PUSCH transmission or PRACH transmission. Since the timing offset is different between PRACH and PUCCH/PUSCH, the full utilization of the Power Amplifier (PA) is rather difficult.

In the examples above, a bandwidth aggregation scenario has been assumed, where the mobile terminal receives multiple uplink resource assignments for different component carriers within the same TTI. The concept of introducing a priority respectively priority order for uplink assignments can be equally applied for the case of spatial multiplexing. Spatial multiplexing denotes a MIMO technique or MIMO transmission mode, where more than one transport block can be transmitted at the same time and on the same frequency using multiple reception and transmission antennas. Separation of the different transport blocks is done by means of signal processing at the receiver and/or transmitter side. Essentially the transport blocks are transmitted on different MIMO channels respectively MIMO layers but on the same component carrier.

Using spatial multiplexing—which is considered for LTE-A uplink—the uplink resource assignments allocate an uplink resource for MIMO layers on a component carriers. Hence, there may be multiple uplink resource assignments for individual MIMO layers on one component carrier. Similar to the introduction of a priority order for component carriers, also for MIMO scenarios a priority or priority order of the uplink resource assignments for the MIMO layers is used in the generation of the transport blocks. The priority order of the MIMO layers could be pre-configured (e.g. during radio bearer establishment) or could be signaled by physical layer, MAC or RRC signaling as mentioned previously.

Hence, assuming a single component carrier system—such as LTE Rel. 8—the uplink resource assignments for the individual MIMO layers of the component carrier could be accumulated to a virtual transport block and a joint logical channel procedure could be performed on the virtual transport block as described before. The content of the virtual transport block needs to be then divided to the individual transport blocks according to the priority order of their assignments and the transport blocks are transmitted via the respective antennas of the mobile terminal.

Similarly also a parallelization of joint logical channel procedures is possible, by operating on transport blocks, respectively uplink resource assignments for MIMO layers instead of transport blocks, respectively uplink resource assignments for component carriers.

Furthermore, the concepts of the invention outlined herein may also be used in systems that provide bandwidth aggregation (i.e. multiple component carriers are configured) and spatial multiplexing. In this case the uplink resource assignment grants a resource on the uplink for transmitting a transport block on a given MIMO layer and component carrier. Also for this system design the joint logical channel procedures can be used in a similar fashion as discussed above.

In this context, please note that there may be a "joint" priority order for uplink resource assignments on a per MIMO layer and per component carrier basis, or alternatively, there may be separate priority orders, i.e. a priority order for MIMO layers (independent from the component carriers) and a priority order for the component carriers (independent from the component carriers). Third, there is also the possibility that spatial multiplexing is used but MIMO layers are assumed to be equal priority (so that there is no priority order for MIMO layers), however there is a priority order for the component carriers.

In the first case, where there is a "joint" prioritization based on MIMO layer and component carrier, the (joint) logical channel prioritization procedures can be reused to generate the transport blocks for the individual component carriers and MIMO layers.

In the second and third case, according to an embodiment of the invention, the uplink resource assignments of the MIMO layers are first accumulated (e.g. according to the MIMO layer priorities, if available) per component carrier, and subsequently the obtained virtual transports blocks of the component carriers are accumulated according to their priority order to perform a (joint) logical channel prioritization on the virtual transport block obtained from the component carrier-wise accumulation.

When having filled the virtual transport block obtained from the component carrier-wise accumulation with data of the logical channels, same is again divided in virtual transport blocks per component carrier, and subsequently the virtual transport blocks per component carrier are further divided into individual transport blocks for the respective MIMO layers in each component carrier.

In a further embodiment of the invention, in the third case where there is no priority order of the MIMO layers, there may be one uplink resource assignment sent per component carrier that covers all MIMO layers. Accordingly, in this case the accumulation of uplink grants for the MIMO layers in the procedure above can be omitted. Nevertheless, the virtual transport blocks per component carrier obtained by division needs to be further divided to transport blocks for the MIMO layers in each component carrier—e.g. assigning equal shares of the virtual transport blocks per component carrier to each MIMO layer for transmission.

In some embodiment of the invention, the concepts of the invention have been described with respect to an improved 3GPP LTE system, where there is one component carrier configured on the air interface. The concepts of the invention may also be equally applied to a 3GPP LTE-A (LTE-A) system presently discussed in the 3GPP.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for controlling transmit powers for transmissions of transport blocks on uplink component carriers of a mobile communication system in a power limited situation, the method comprising the following steps performed by a mobile terminal:

receiving uplink resource assignments that schedule transmissions of the transport blocks on the uplink component carriers within a transmission time interval, wherein the uplink resource assignments have a priority order, determining for each transmission of a respective one of the transport blocks, a transmit power required for transmitting the respective transport block according to its corresponding uplink resource assignment, reducing the determined transmit power for each transmission of a respective one of the transport blocks according to the priority of the transport block given by the priority orders, wherein the lower the priority of an uplink resource assignment, the larger the power reduction applied to the transmit power for the transmission of the transport block required by its corresponding uplink resource assignment, and the higher the priority of an uplink resource assignment, the smaller the power reduction applied to the transmit power for the transmission of the transport block required by its corresponding uplink resource assignment, and transmitting the transport blocks on the uplink component carriers within the transmission time interval, wherein each transport block is transmitted using the reduced transmit power.

2. The method according to claim 1, further comprising the step of determining for the transmission of each transport block i of the transport blocks, a scaling factor $s_i$, where $s_i \in [0, \ldots, 1]$, wherein the determination of the respective scaling factor $s_i$ for each of the transport blocks is based on the priority of the resource assignment corresponding to the respective transport block i as given by the priority order, wherein reducing the transmit power comprises scaling for each transmission of a respective one of the transport blocks the determined transmit power according to the priority of the transport block given by the priority order.

3. The method according to claim 2, wherein the scaling factors $s_i$ for the transport blocks are determined such that the sum of the required transmit powers scaled by the scaling factors $s_i$ for the transport blocks is smaller or equal to a maximum transmit power available to the mobile terminal for transmitting the transport blocks.

4. The method according to claim 1, further comprising the step of generating the transport blocks for transmission, wherein the data of different logical channels is multiplexed to the transport blocks according to the priority order of their corresponding uplink resource assignments.

5. The method according to claim 1, wherein the priority order of the uplink resource assignments is determined based on the priority indicated for each uplink resource assignment.

6. The method according to claim 1, wherein each uplink component carrier is assigned a carrier indicator and the priority order of the uplink resource assignments is determined by the carrier indicators of the component carriers scheduled by the uplink resource assignments.

7. The method according to claim 1, wherein each uplink resource assignment is allocating radio resources on one of plural component carriers and the component carriers are assigned respective priorities, wherein the priority order of the uplink resource assignments is determined according to the priorities of the component carriers on which resources are allocated by the uplink resource assignments.

8. The method according to claim 7, wherein the priority order of the component carriers is signaled by means of higher layer signaling to the mobile terminal.

9. The method according to claim 1, wherein the priority order of the uplink resource assignments is given by their transmission timing on the control channel.

10. The method according to claim 1, wherein the priority of each uplink resource assignment is determined by the type of the component carrier to which it pertains, and the priority order is determined based on the priorities of the uplink resource assignments.

11. The method according to claim 1, wherein the priority order of the uplink resource assignments is determined by the mobile terminal based on at least one parameter included in each uplink resource assignment, wherein the at least one parameter includes at least one of:

a modulation and coding scheme level indicated in a respective one of the uplink resource assignments;

a transport block size indicated by a respective uplink resource assignments; and a scheduling mode indicated by a respective uplink resource assignments.

12. A mobile terminal for controlling transmit powers of transmissions of transport blocks on uplink component carriers of a mobile communication system in a power limited situation, the mobile terminal comprising:
a receiver for receiving uplink resource assignments that schedule transmissions of the transport blocks on the uplink component carriers within a transmission time interval, wherein the uplink resource assignments have a priority order,
a processor for determining for each transmission of a respective one of the transport blocks, a transmit power required for transmitting the respective transport block according to its corresponding uplink resource assignment,
a power controller for reducing the determined transmit power for each transmission of a respective one of the transport blocks according to the priority of the transport block given by the priority order, wherein the power controller is adapted to reduce the required transmit power for each transmission of a respective one of the transport blocks inversely proportional to the priority of the resource assignment of a respective transport block as given by the priority order, and
a transmitter for transmitting the transport blocks on the uplink component carriers within the transmission time interval, wherein each transport block is transmitted using the reduced transmit power.

13. The mobile terminal according to claim 12, wherein the processor is adapted to determine for the transmission of each transport block I of the transport blocks, a scaling factor $s_i$ where $s_i \epsilon [0, \ldots, 1]$, wherein the determination of the respective scaling factor $s_i$ for each of the transport blocks is based on the priority of the resource assignment corresponding to the respective transport block i as given by the priority order, and
wherein the power controller is adapted to scale for each transmission of a respective one of the transport blocks the determined transmit power according to the priority of the transport block given by the priority order.

14. The mobile terminal according to claim 12,
wherein the receiver is adapted to receive the uplink resource assignments on a control channel, and wherein the uplink resource assignments are allocating respective radio resources for uplink transmission to the mobile terminal, and
wherein the mobile terminal further comprises a transport block generator for generating respective transport blocks for transmission on the allocated respective radio resources, wherein the data of different logical channels is multiplexed to the transport blocks according to the priority order of their corresponding uplink resource assignment.

15. The mobile terminal according to claim 12, wherein the transmitter is configured to transmit generated transport blocks within a transmission time interval on plural component carriers.

16. The mobile terminal according to claim 12, wherein the transmitter is adapted to transmit the transport blocks via a shared uplink channel on radio resources allocated by the resource assignments.

17. The mobile terminal according to claim 12, wherein the receiver is adapted to receive information on the priority order of the uplink resource assignments via MAC control signaling or radio resource signaling.

* * * * *